US005272570A

United States Patent [19]

Yoshida et al.

[11] Patent Number: 5,272,570

[45] Date of Patent: Dec. 21, 1993

[54] ILLUMINATING REFLECTION APPARATUS

[75] Inventors: Kazushi Yoshida, Shizuoka; Yasuyuki Tejima, Tokyo, both of Japan

[73] Assignee: Asahi Kogaku Kogyo Kabushiki Kaisha, Tokyo, Japan

[21] Appl. No.: 694,335

[22] Filed: May 1, 1991

[30] Foreign Application Priority Data

May 2, 1990 [JP] Japan .................................. 2-116379
May 2, 1990 [JP] Japan .................................. 2-116380
Sep. 6, 1990 [JP] Japan .................................. 2-236418

[51] Int. Cl.[5] .......................... G02B 5/08; G02B 5/10; F21V 7/00

[52] U.S. Cl. .................................... 359/853; 359/850; 359/869; 362/350

[58] Field of Search ............... 359/850, 857, 858, 868, 359/869, 851, 853; 362/297, 298, 302, 304, 347, 350

[56] References Cited

U.S. PATENT DOCUMENTS 3,443,086 5/1969 Rikis .................................. 359/858
4,050,775 9/1977 Scholten ............................. 359/858
4,218,727 8/1980 Shemitz et al. ..................... 362/350
4,320,442 3/1982 McCamy ............................. 362/847
4,871,249 10/1989 Watson ............................... 359/858
4,991,072 2/1991 Malfeaud ............................ 362/297

*Primary Examiner*—Bruce Y. Arnold
*Assistant Examiner*—Darryl Collins
*Attorney, Agent, or Firm*—Sandler Greenblum & Bernstein

[57] ABSTRACT

An illuminating reflection apparatus including a light source having a light emitting portion, a main mirror for reflecting light emitted from the light source toward an illuminating area, and an auxiliary mirror for reflecting light emitted from the light source toward the main mirror. The light source and the auxiliary mirror are correlated so that light emitted from the light emitting portion and reflected by the auxiliary mirror is returned to the light emitting portion.

21 Claims, 20 Drawing Sheets

PRIOR ART

ILLUMINATING REFLECTION APPARATUS

BACKGROUND OF THE INVENTION

1. Field of the Invention

The present invention relates to an illumination apparatus having a reflecting mirror for reflecting light from a light source toward an object to be illuminated.

2. Description of Related Art

In a known illumination apparatus, a reflecting mirror is provided behind a light source, so that not only light directly emitted from the light source, but also light reflected by the reflecting mirror are made incident upon an object to be illuminated, thus resulting in a more efficient utilization of light. The reflecting mirrors that are used, for example, are elliptic mirrors, parabolic mirrors, or optical aspherical mirrors.

For instance, in the case of an elliptic mirror, when a light source is located at a first focal point thereof, light emitted from the light source and reflected by the mirror surface is converged onto a second focal point. The light utilization efficiency increases as the extension of the mirror surface from the apex thereof on the first focal point side increases. However, by increasing this extension, the diameter of the mirror is also increased, resulting in a large mirror. Such a large mirror requires a bright and expensive projection lens (i.e., a projection lens having a small F-number) to fully converge and project the light reflected by the elliptic mirror onto an object (e.g., a chart), because the angle between the light flux reflected by the elliptical mirror and the optical axis of the mirror increases.

In the case of a parabolic mirror, light emitted from a light source located at a focal point and reflected by the mirror surface is emitted therefrom to be parallel with an optical axis thereof. FIG. 16 shows the relationship between a focal length "f" and an emission light flux diameter "$\phi$" in a parabolic mirror R, provided that an acceptance angle S of light from a light source L is constant. When an object (e.g., a chart) is small, it is desirable to decrease both the focal length "f" and the emission light flux diameter "$\phi$". However, if the focal length "f" is decreased, there is a possibility that a reflecting surface area of the parabolic mirror is made too small to effectively reflect light, depending on the size of the light source L. Furthermore, since the distance between the light source L and the reflecting surface is decreased, light energy per unit reflecting surface area, becomes large, resulting in an accelerated deterioration of the coating layer of the reflecting surface and decreased heat radiation within the parabolic mirror.

On the other hand, if the focal length "f" is increased, the light flux diameter "$\phi$" is larger than necessary to cover the object. This results in an increased loss of light. To prevent this, it is possible to use a relay lens to make the light flux diameter "$\phi$" smaller to the minimum diameter required to cover be identical to the size of the object. However, in this case, the angular magnification becomes larger, so that the angle of intersecting light rays becomes larger. Consequently, it is necessary to use a bright projection lens (i.e., a projection lens having a small F-number), which is very expensive, in order to increase the light gathering efficiency.

SUMMARY OF THE INVENTION

The primary object of the present invention is to provide a small and inexpensive illumination apparatus in which a reflecting mirror is located behind a light source and which has a high light utilization efficiency.

Another object of the present invention is to provide an illuminating reflection apparatus having an improved distribution of the quantity of light. A larger quantity of light is incident upon a center area of an object to be illuminated. The quantity of light is gradually decreased toward the circumferential portion of the object.

To achieve the objects mentioned above, according to the present invention, there is provided an illuminating reflection apparatus comprising a light source having a light emitting portion, a main mirror for reflecting light emitted from the light source toward an illuminating area, and an auxiliary mirror for reflecting light emitted from the light source toward the main mirror. The light source and the auxiliary mirror are correlated so that light emitted from the light emitting portion and reflected by the auxiliary mirror is returned to the light emitting portion.

There is no limitation to the shape of the main mirror. For instance, the main mirror can be comprised of a parabolic mirror, an elliptical mirror or an optional aspherical mirror, etc.

The auxiliary mirror can be comprised of, for example, a spherical mirror, a spherical Fresnel mirror, or a micro roof mirror, etc.

In theory, if the light source is an ideal point light source, the focal point of the main mirror is preferably made coincidental with the light emitting portion of the light source. However, no ideal point light source actually exists, so that the vignetting of light reflected by the main mirror and the auxiliary mirror is caused by the light source (lamp) in the vicinity of the optical axis of the illuminating light. As a result, a phenomenon in which the quantity of light is decreased at the center portion of the illuminating area occurs.

The inventors of the present invention have found that this phenomenon does not take place when the focal point of the main mirror is offset from the light emitting portion by a predetermined deviation.

To this end, according to another aspect of the present invention, there is provided an illuminating reflection apparatus comprising a light source having a light emitting portion, a main mirror for reflecting light emitted from the light source toward an illuminating area, and an auxiliary mirror for reflecting light emitted from the light source toward the main mirror. The light source and the auxiliary mirror are correlated so that light emitted from the light emitting portion and reflected by the auxiliary mirror is returned to the light emitting portion, and wherein the focal point of the main mirror is offset from the light emitting portion of the light source.

The present disclosure relates to subject matter contained in Japanese patent applications No. 02-116379 (filed on May 2, 1990), No. 02-116380 (filed on May 2, 1990) and No. 02-236418 (filed on Sept. 6, 1990), which are expressly incorporated herein by reference in their entirety.

BRIEF DESCRIPTION OF THE DRAWINGS

The invention will be described below in detail with reference to the accompanying drawings, in which.

DESCRIPTION OF PREFERRED EMBODIMENTS

In embodiments illustrated in FIGS. 1A through 5, an elliptical mirror is used as a main mirror.

Figure 1A:
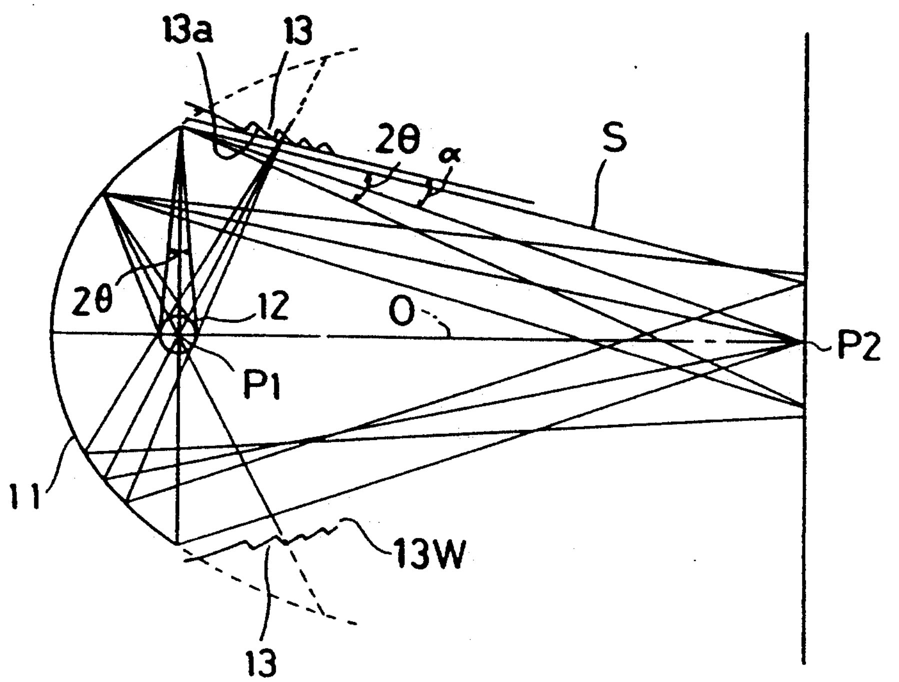
FIG. 1A is a theoretical schematic view of rays of light in which the size of the light source is neglected in an illuminating reflection apparatus according to a first embodiment of the present invention.
Figure 1B:
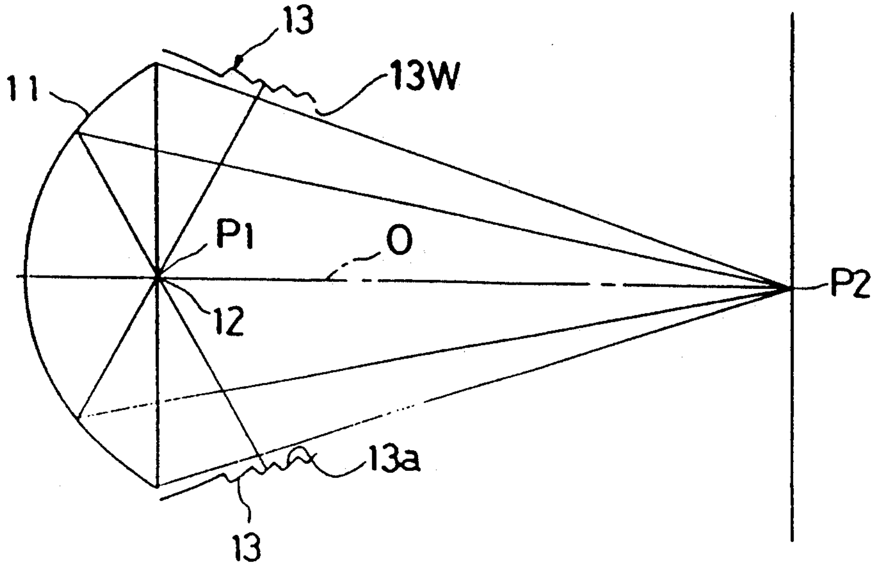
FIG. 1B a schematic view similar to FIG. 1A, in which the size of the light source is taken into account.

FIGS. 1A and 1B show a first embodiment of an illuminating reflection apparatus according to the present invention, in which the elliptical mirror 11 has a first focal point P1 on which a light source 12 is located. The elliptical mirror 11 is preferably extended so that an open end thereof terminates at a plane substantially perpendicular to the optical axis 0 and passes the first s focal point P1 so as to effectively utilize light, as shown in FIGS. 1A and 1B.

Auxiliary mirrors 13, which are in the form of spherical Fresnel mirrors having illuminated openings 13W at the center portion thereof, are provided in the vicinity of an open end of the elliptical mirror 11. The spherical Fresnel mirror (auxiliary mirror) 13 is comprised of a number of small reflecting spherical surfaces 13$a$, each having a center on the first focal point P1, so that rays of light reflected by the reflecting spherical surfaces 13$a$ are returned to the light source 12 and reach the elliptical mirror 11. The rays of light emitted from the light source 12 and directly reflected by the elliptical mirror 11 and the rays of light reflected by the spherical Fresnel mirror 13 and then by the elliptical mirror 11 are converged onto a second focal point P2 of the elliptical mirror 11 due to characteristics of the elliptical mirror 11.

On the assumption that the light source 12 is an ideal point light source, the spherical Fresnel mirror 13 extends along the straight lines (conical plane) connecting the open end of the elliptical mirror 11 to the second focal point P2, as shown in FIG. 1B. However, in practice, no ideal point light source exists. Accordingly, in the optical arrangement in which the spherical Fresnel mirror 13 extends along the straight lines (conical plane) connecting the open end of the elliptical mirror 11 to the second focal point P2, a loss of light increases due to vignetting by the spherical Fresnel mirror 13.

FIG. 1A shows a practical optical arrangement in which the size of the light source 12 is taken into account. In FIG. 1A, the Fresnel mirror 13 is slightly inclined with respect to the straight lines (conical plane) connecting the open end of the elliptical mirror 11 and the second focal point P2 so as to cover the outermost rays of light S emitted from the light source 12 and reflected by the elliptical mirror 11. Namely, supposing that the angle defined by the open end of the elliptical mirror 11 and a certain size of light source 12 is 2$\theta$, the light flux emitted from the light source 12 and reflected by the open end of the elliptical mirror 11 defines the same angle 2$\theta$. When the open angle $\alpha$ of the spherical Fresnel mirror 13, with respect to the main light reflected by the open end of the elliptical mirror 11 toward the second focal point P2, is slightly larger than $\theta$, the loss of light due to vignetting is reduced. In this case, the small reflecting spherical surfaces 13$a$ of the spherical Fresnel mirror 13 are made of spherical surfaces having centers substantially located on the first focal point P1, so that the rays of light emitted from the center of the light source 12 are returned to the light source 12.

Since the rays of light reflected by the spherical Fresnel mirror 13 are returned to the light source 12, it is preferable to use a discharge lamp having no filament, such as a xenon lamp, a high voltage mercury vapor lamp, or a metal halide lamp, etc., as the light source 12.

Figure 2A:
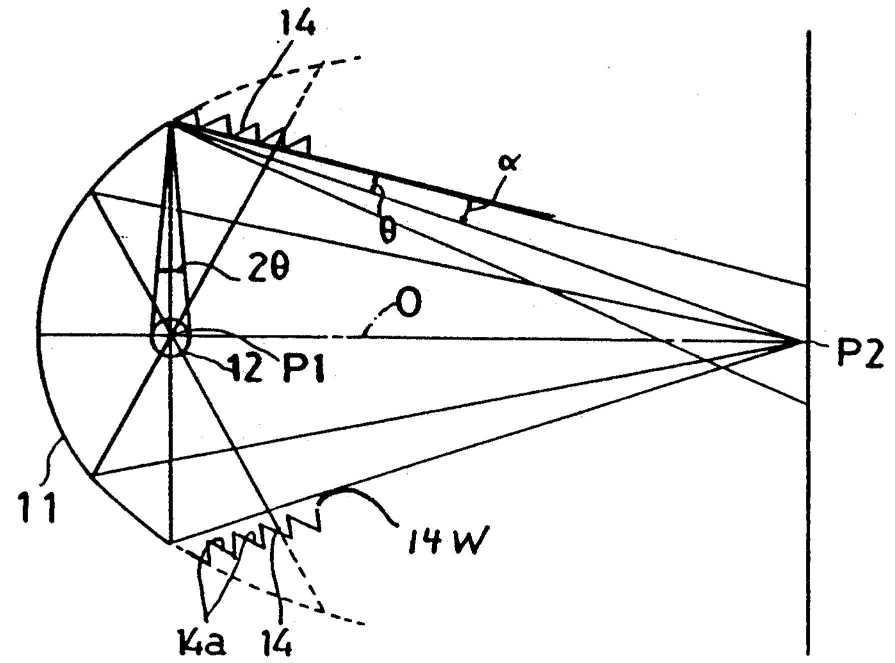
FIG. 2A is a theoretical schematic view of rays of light in which the size of the light source is neglected in an illuminating reflection apparatus according to a second embodiment of the present invention.
Figure 2B:
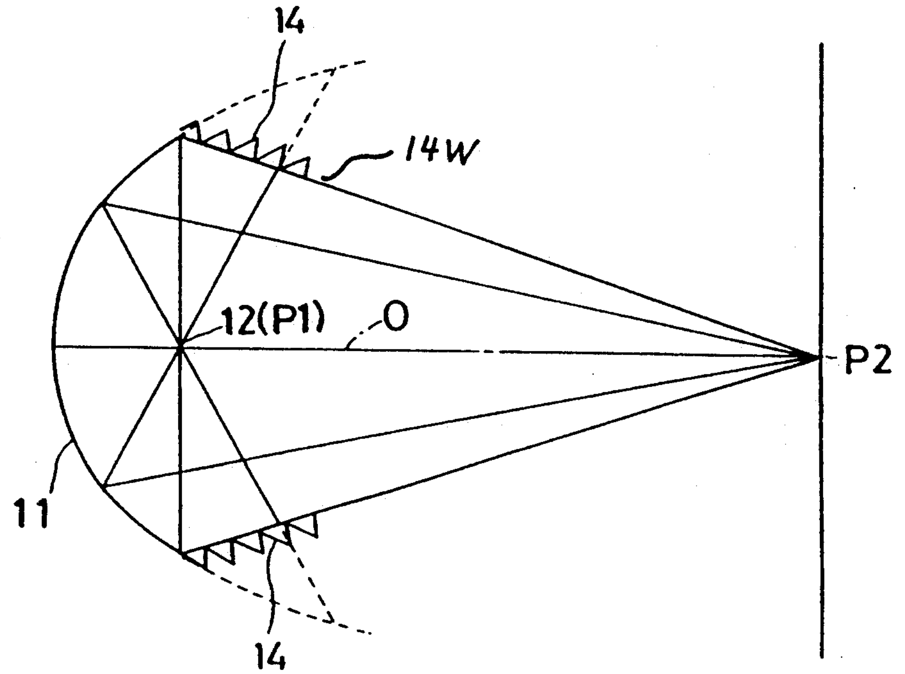
FIG. 2B is a view similar to FIG. 2A, in which the size of the light source is taken into account.
Figure 3A:
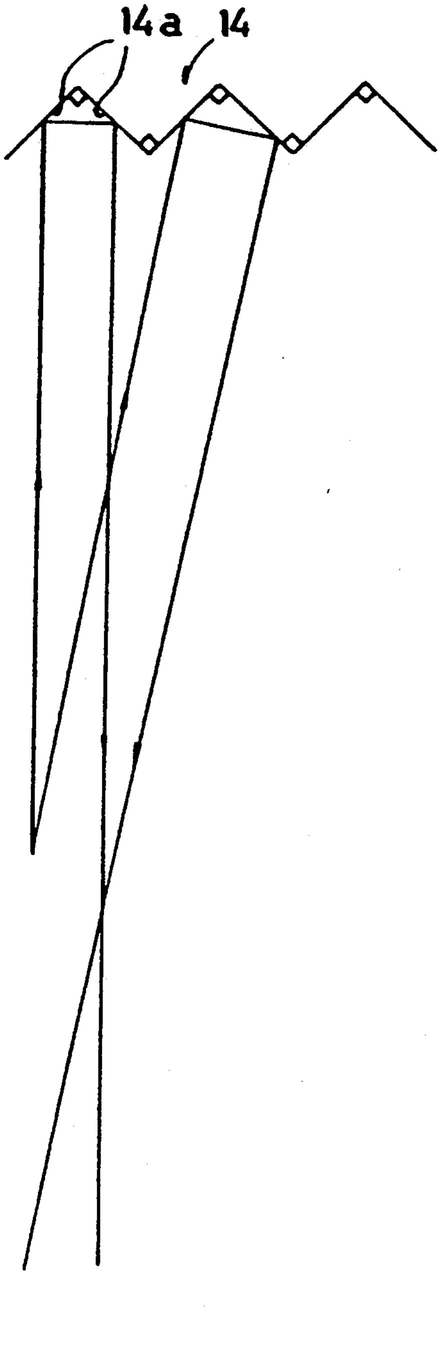
FIGS. 3A and 3B are schematic views of a micro roof mirror used in the present invention.
Figure 3B:
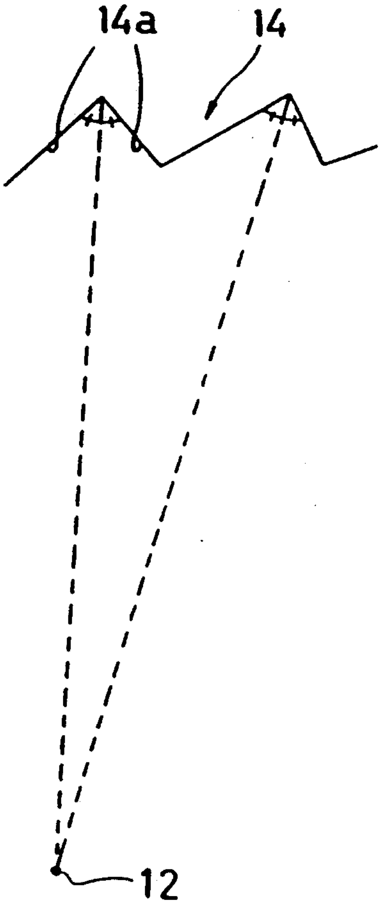

In a second embodiment illustrated in FIGS. 2A and 2B, the spherical Fresnel mirror 13 is replaced with a micro roof mirror 14 having an illuminating opening 14W at the center portion thereof. The micro roof mirror 14 is an optical element which reflects light incident thereon in a direction identical (parallel) to the incident light. FIGS. 3A and 3B show the arrays of pairs of orthogonal roof reflecting surfaces 14a. In FIG. 3A, identical fine reflection patterns, each having a pair of small roof reflecting surfaces 14a, are contiguously arranged. On the other hand, in FIG. 3B, imaginary extensions of bisectors of angle, defined by and between the adjacent roof reflecting surfaces 14a of the associated reflection patterns pass the light source 12.

Consequently, the micro roof mirror 14, as constructed above, can be used instead of the spherical Fresnel mirror 13, as used in the first embodiment, shown in FIGS. 1A and 1B. FIGS. 2A and 2B correspond to FIGS. 1A and 1B, respectively. The elements in FIGS. 2A and 2B, corresponding to those in FIGS. 1A and 1B, are designated with the same reference numerals.

The technical effect of the present invention will be explained below with reference to FIG. 4.

Figure 4:
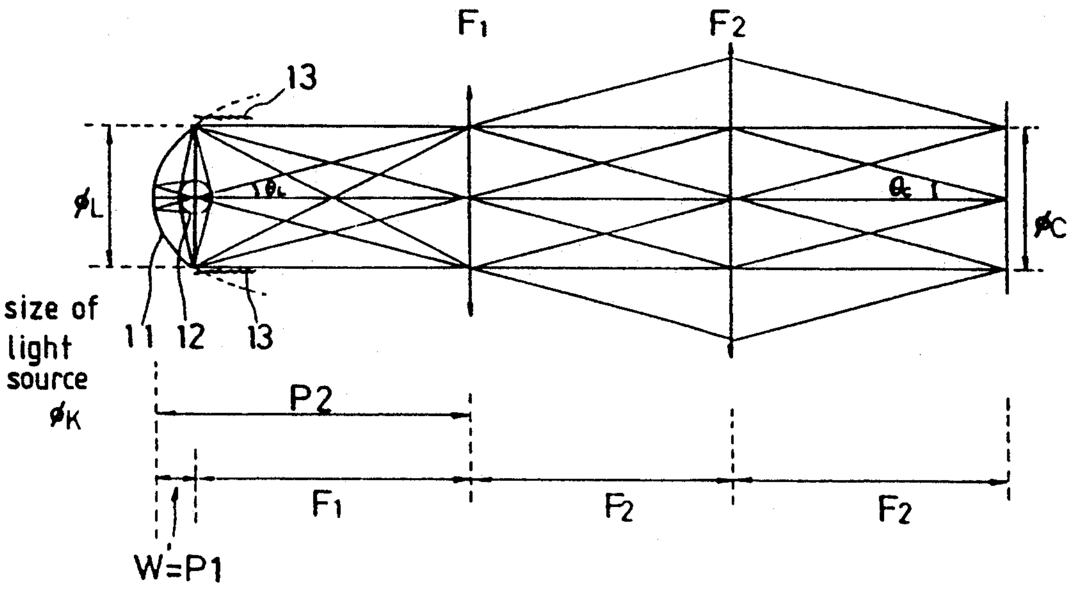
FIGS. 4 and 5 are schematic views of rays of light, showing a technical effect of the present invention, in comparison with the prior art.

In FIG. 4, "$\phi_L$" designates the light flux diameter at the open end of the illuminating reflection apparatus of the present invention, in which the spherical Fresnel mirror 13 is used, and "$\phi_c$" the effective diameter of an object (chart). To project the light flux diameter "$\phi_L$" as a reduced chart of the effective diameter "$\phi_c$", two lens systems $F_1$ and $F_2$ are used.

There is a following relationship between these parameters;

$$\phi_c/\phi_L = F_2/F_1 \quad ①$$

Taking the diameter $\phi_K$ of the light source into consideration, the largest spread angle $\theta_L$ (on one side) of rays of light emitted from the illuminating reflection apparatus according to the present invention at the open end of the mirror 11 with respect to the main rays of light, is given by the following formula;

$$\sin\theta_L = P2/P1 \cdot \phi_K/2 \cdot 1/F_1 \quad ②$$

If the Abbe's sine condition is satisfied, the convergence angle $\theta_c$ (on one side) of rays of light onto the chart satisfies the following equation;

$$\begin{aligned} F_1\sin\phi_L &= F_2\sin\theta_c \\ \therefore \sin\theta_c &= F_1/F_2 \cdot \sin\theta_L \\ &= F_1/F_2 \cdot P2/P1 \cdot \phi_K/2F_1 (\because ②) \\ &= \phi_L/\phi_c \cdot P2/P1 \cdot \phi_K/2F_1 (\because ①) \\ &= P2/P1 \cdot \phi_L/\phi_c \cdot \phi_K/2F_1 \ldots ③ \end{aligned}$$

On the assumption that the F-number of the projection lens (not shown) provided behind the chart, necessary to receive all the rays of light transmitted through the chart, is defined by the following formula;

$$F_{NO} = \tfrac{1}{2}\sin\theta$$

we have the following equation ④ from formula ③;

$$F_{NO} = P1/P2 \cdot \phi_c/\phi_L \cdot F_1/\phi_K \quad ④$$

Figure 5:
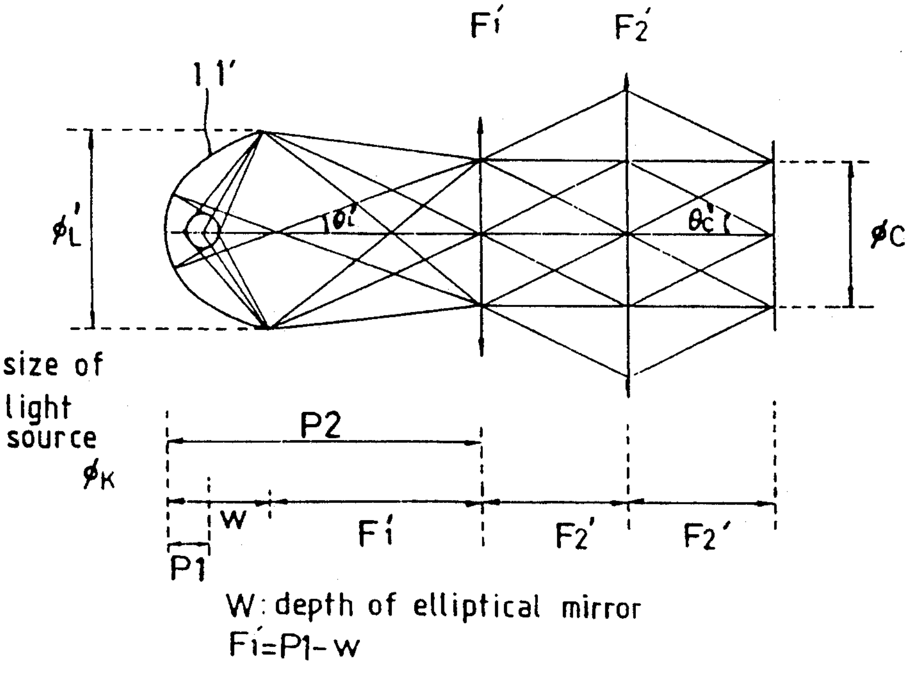
Fig. 5 PRIOR ART

In FIG. 5 which shows an arrangement similar to FIG. 4, a conventional elliptical mirror 11' is used for comparison. In FIG. 5, "$\phi_c$" designates the effective diameter of the chart, "$\phi_K$" the diameter of the light source, and "$\phi_L'(>\phi_L)$" the diameter of the light flux at the open end of the elliptical mirror 11'. In this state, $$\phi_c/\phi_L' = F_2'/F_1' \quad ⑤$$

$$\sin\theta_L' = P2/P1 \cdot \phi_K/2 \cdot 1/F_1' \quad ⑥$$

The convergence angel $\theta_c'$ (on one side) of rays of light onto the chart is given by;

$$\begin{aligned} F_1'\sin\phi_L' &= F_2'\sin\theta_c' \\ \therefore \sin\theta_c' &= F_1'/F_2' \cdot \sin\theta_L' \\ &= F_1'/F_2' \cdot P2/P1 \cdot \phi_K/2F_1' (\because ⑥) \\ &= \phi_L'/\phi_c \cdot P2/P1 \cdot \phi_K/2F_1' (\because ⑤) \\ &= P2/P1 \cdot \phi_L'/\phi_c \cdot \phi_K/2F_1' \ldots ⑦ \end{aligned}$$

The F-number $F_{NO}'$ of the projection lens (not shown) provided behind the chart, necessary to receive all the rays of light transmitted through the chart, is given by the following formula;

$$F_{NO}' = P1/P2 \cdot \phi_c/\phi_L' \cdot F_1'/\phi_K \quad ⑧$$

There are relationships between the illuminating reflection apparatuses according to the present invention and the prior art, as follows;

$$\phi_L'/\phi_L$$

$$F1' < F1$$

From ④ and ⑧, $$F_{NO} > F_{NO}'$$

This means that the F-number of the projection lens provided behind the chart, necessary for receiving all the rays of light transmitted through the chart, in the present invention is larger than that of the elliptical mirror 11' in the prior art. Generally speaking, the design of a lens becomes easier and less expensive as the F-number thereof becomes larger.

When the F-number of the projection lens is $F_{NO}''(>F_{NO}>F_{NO}')$, only a part of the rays of light transmitted through the chart can be received by the projection lens. The efficiencies K and K' of the utilization of light (light acceptance efficiencies) in the present invention and the prior art are given by;

$$K = (F_{NO}/F_{NO}'')^2$$

$$K' = (F_{NO}'/F_{NO}'')^2$$

Namely, K>K'

This proves that a higher light utilization efficiency can be achieved by the present invention.

In an example, when $\phi_L'=42$ mm, $\phi_c=30$ mm, P1=8.5 mm, P2=63.75 mm, $\phi_K=4$ mm, and $\phi_L=30$ mm (90° from the optical axis=4·P1·P2/(P1+P2));

$$F_1=F_2=55.250 \text{ mm}$$

$$F_1'=43.212 \text{ mm}, F_2'=30.866 \text{ mm } (\theta_L'=20.312°, \theta_c'=29.076°, \theta_L=\theta_c=15.753°)$$

and, $$F_{NO}=1.842, F_{NO}'=1.029$$

It can be inferred from the present invention that a projection lens having a larger F-number can be used.

$$\text{If } F_{NO}''=4,$$

$$K=0.212, K'=0.066$$

This means that the light utilization efficiency in sent invention is about three times that of the prior art.

The following discussion will be directed to the embodiments illustrated in FIGS. 6A through 15 in which a parabolic mirror 11A is used as the main mirror.

FIGS. 6A through 6C and 7A through 7B are explanatory views for explaining the principle of the illuminating reflection apparatus of the present invention as well as the critical shapes of the parabolic mirror 11A having apex T, and an auxiliary mirror having a spherical mirror 13A to decrease the quantity loss of light.

In this arrangement, the point light source is located at the focal point F of the parabolic mirror 11A, and the spherical mirror 13A (auxiliary mirror). A spherical surface, having a center located on the focal point F and a center illuminating opening 13W, is located in the vicinity of the open end of the parabolic mirror 11A. Due to the characteristics of the parabolic mirror 11A, light from the focal point F, reflected by the parabolic mirror 11A, is emitted in a direction parallel to the illumination light axis O. Light from the focal point F, reflected by the spherical mirror 13A, is emitted toward the focal point F and is reflected by the parabolic mirror 11A in a direction parallel to the optical axis O.

In the illuminating reflection apparatus as constructed above, when the depth of the parabolic mirror 11A is represented by an angle X, which is defined by and between a first line which connects apex T of the parabolic mirror 11A on the optical axis O and the focal point $F_1$ and a second line (plane) which passes the focal point F and the open end Q of the parabolic mirror 11A, and if the angle X is smaller than 90°, then the rays of light which are emitted from the focal point F toward the spherical mirror 13A, including the angle area (hatched area in FIG. 6A) outside the parabolic mirror 11A and within 90° of X, can not be returned to the parabolic mirror 11A after being reflected by the spherical mirror (auxiliary mirror) 13A, thus resulting in a loss of light.

Figure 6A:
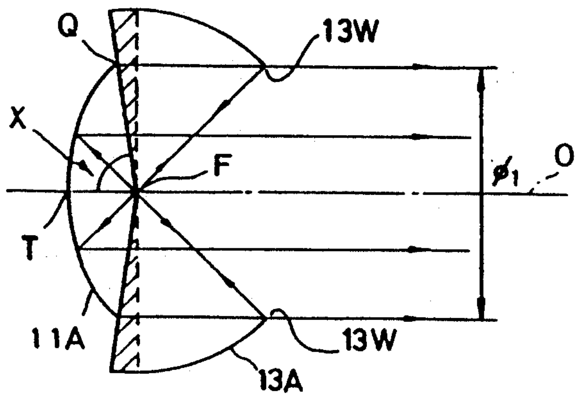
FIGS. 6A, 6B and 6C are schematic views of rays of light, showing a relationship between the depth of the main mirror of a parabolic mirror, the diameter of the open end thereof, and loss of light.
Figure 6B:
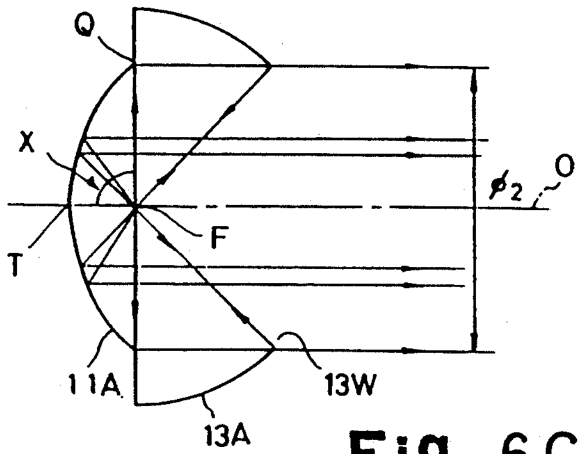
Figure 6C:
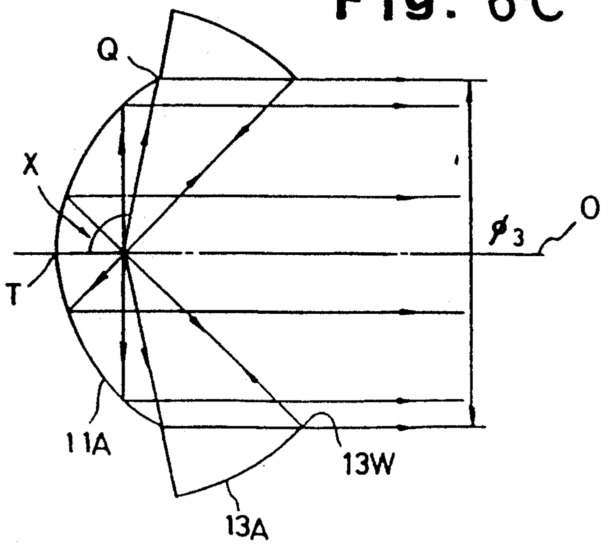

On the other hand, if the depth (angle X) is equal to or greater than the critical angle 90°, as shown in FIGS. 6B and 6C, there is no loss of light. Accordingly, the angle X is preferably equal to or greater than 90°. The diameters $\phi$1, $\phi$2, and $\phi$3 of the open end of the parabolic mirror 11A decrease as the angle X decreases. The angle X beyond 90° can be properly determined in accordance with the requirements of the necessary illuminating areas.

Figure 7A:
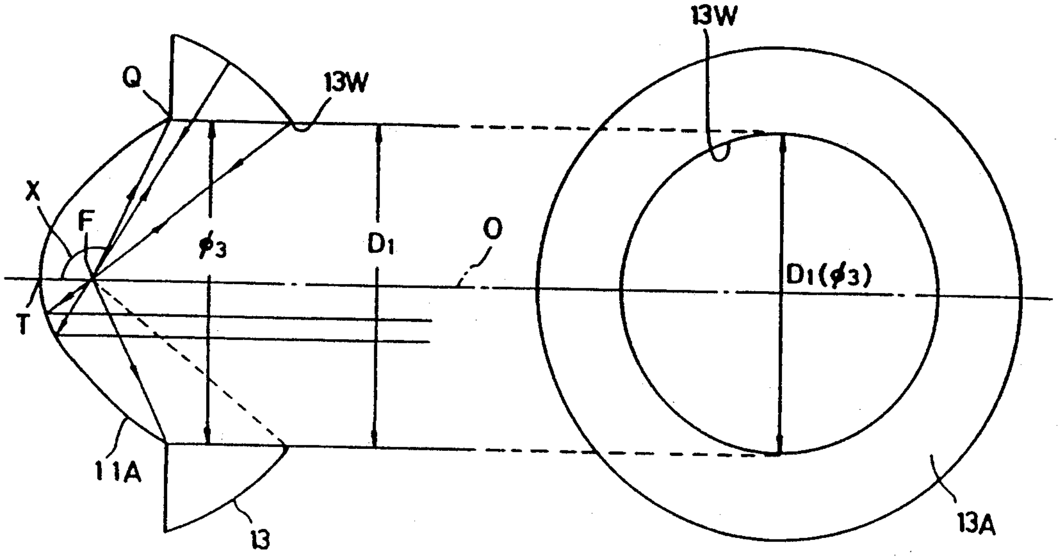
FIGS. 7A and 7B are schematic views of rays of light, showing a relationship between the inner diameter of an auxiliary mirror of a spherical mirror and a loss of light.
Figure 7B:
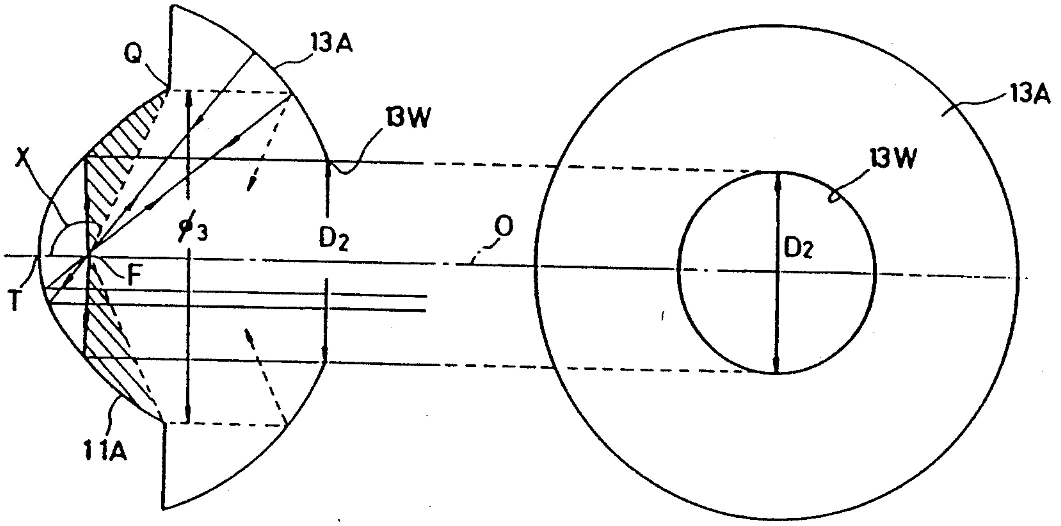

The following discussion will be addressed to the inner diameter of the illuminating opening 13W of the spherical mirror 13A with reference to FIGS. 7A and 7B, in which the angle X is larger than 90°. The inner diameter D1 of the illuminating opening 13W is identical to the inner diameter $\phi$3 of the parabolic mirror 11A in FIG. 7A. In FIG. 7B, the inner diameter D2 of the opening 13W is smaller than the inner diameter $\phi$3 of the parabolic mirror 11A. In the arrangement illustrated in FIG. 7B, the rays of light emitted from the focal point F and made incident upon the parabolic mirror 11A, outside the diameter D2, are reflected by the parabolic mirror 11A and are intercepted by the spherical mirror 13A even if the rays of light are reflected in a direction parallel with the optical axis O. Namely, the rays of light included in the hatched area can not be transmitted through the illuminating opening 13A of the spherical mirror 13, thus resulting in a loss of light.

Conversely, there is no loss of light in the arrangement illustrated in FIG. 7A. Furthermore, if the illuminating opening 13W is larger than the diameter $\phi$3 of the open end of the parabolic mirror 11A, then the rays of light which are emitted from the focal point F and which reach the inside of the illuminating opening 13W are directly emitted in the air, and accordingly, can not be returned to the parabolic mirror 11A, thus resulting in a loss of light.

The above discussion has been directed to an ideal and theoretical point light source located at the focal point F. However, an actual light source has a certain size. Consequently, the diameter of the illuminating opening 13W is preferably determined so as not to intercept the outermost light emitted from the light source and reflected by the parabolic mirror 11A, taking the size of the light source into consideration. The determination of the illuminating opening 13W, as mentioned above is encompassed by the terminology "the diameter of the open end of the parabolic mirror 11A is substantially identical to the diameter of the illuminating opening 13W".

Figure 7C:
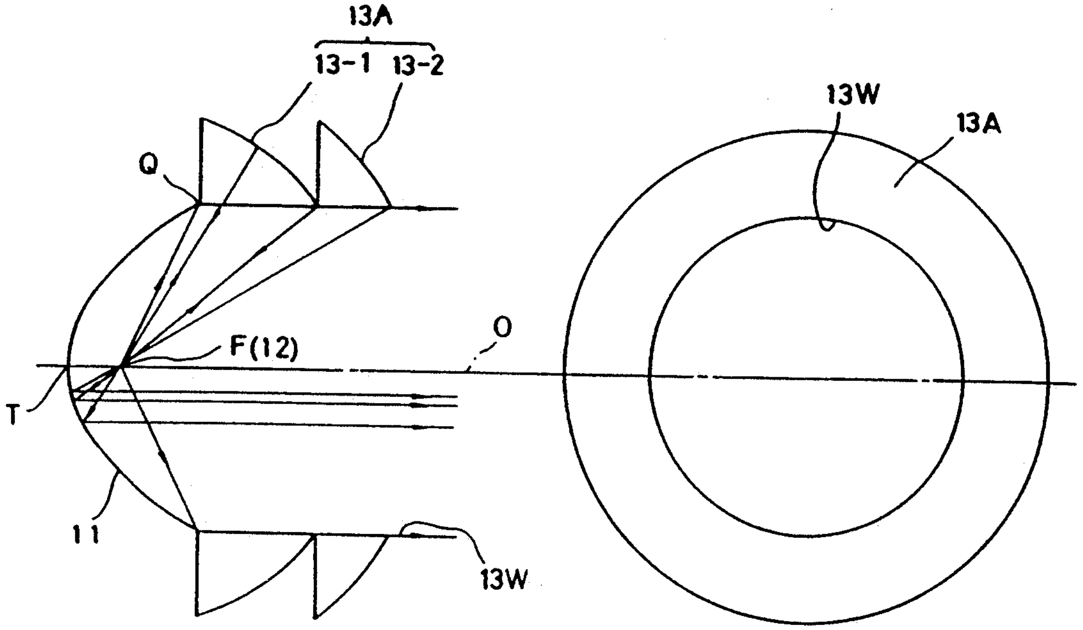
FIG. 7C is a schematic view of rays of light of an auxiliary mirror of a spherical mirror.

In FIG. 7C, the spherical mirror 13A is divided into two mirrors 13-1 and 13-2 and is extended forwardly along the optical axis O to increase the quantity of light which can be received by the spherical mirror 13A and decrease the maximum diameter thereof. Alternatively, it is possible to divide the spherical mirror 13A into more than two mirrors.

Figure 8A:
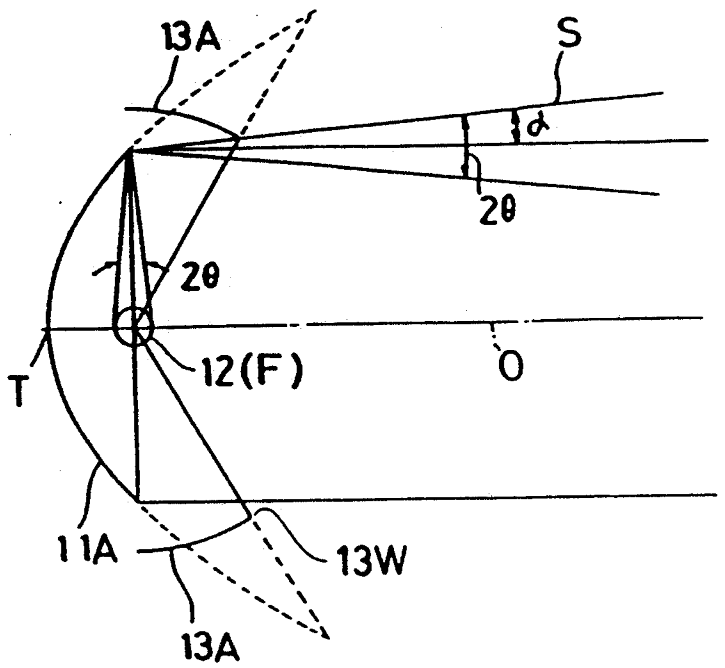
FIG. 8A is a theoretical schematic view of rays of light in which the size of light source is neglected in an illuminating reflection apparatus according to a third embodiment of the present invention.
Figure 8B:
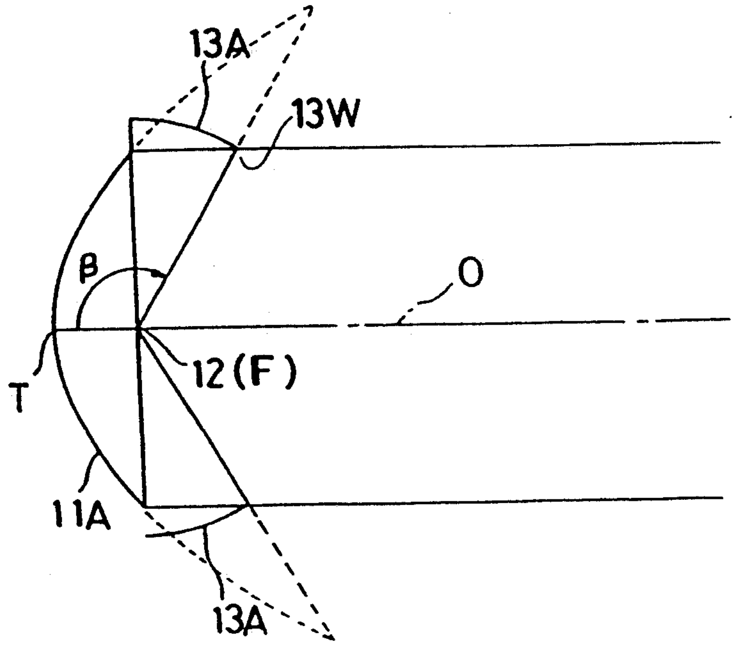
FIG. 8B a view similar to FIG. 8A, in which the size of the light source is taken into account.

In the basic arrangements illustrated in FIGS. 8A and 8B, the angle X of the parabolic mirror 11A is 90°. The size of the light source 12 is taken into account in FIG. 8A and is not taken into account in FIG. 8B, in which an ideal and theoretical point light source 12 is located at the focal point F or the vicinity thereof.

In FIG. 8B, the spherical mirror (auxiliary mirror) 13A is made of an arched surface which has a center on the point light source 12 and which substantially comes into contact at the position of the maximum acceptance angle $\beta$ with the rays of light reflected by the open end of the parabolic mirror 11A in parallel with the optical axis O. However, since no ideal point light source exists, there is an increased loss of light, which is vignetted by the spherical mirror 13A in the arrangement as shown in FIG. 8B.

FIG. 8A shows a practical arrangement in which the size of the light source 12 is taken into account. In FIG. 8A, the spherical mirror 13A is shifted to a position in which no interception of the outermost rays of light S, emitted from the light source 12 and reflected by the parabolic mirror 11A at the open end thereof, takes place. Namely, on the assumption that the angle of the rays of light emitted from the light source 12 and directly converged onto the open end of the parabolic mirror 13A is $2\theta$, the rays of light emitted from the light source 12 and reflected by the parabolic mirror 11A at the open end thereof, are emitted therefrom at the same angle $2\theta$. The spherical mirror 13A is placed so as not to intercept the outermost rays of light S.

Since the rays of light reflected by the spherical mirror 13A are returned to the light source 12, it is preferable to use a discharge lamp having no filament, such as a xenon light source, a high voltage mercury vapor lamp, or a metal halide lamp, etc., as the light source 12.

Figure 9A:
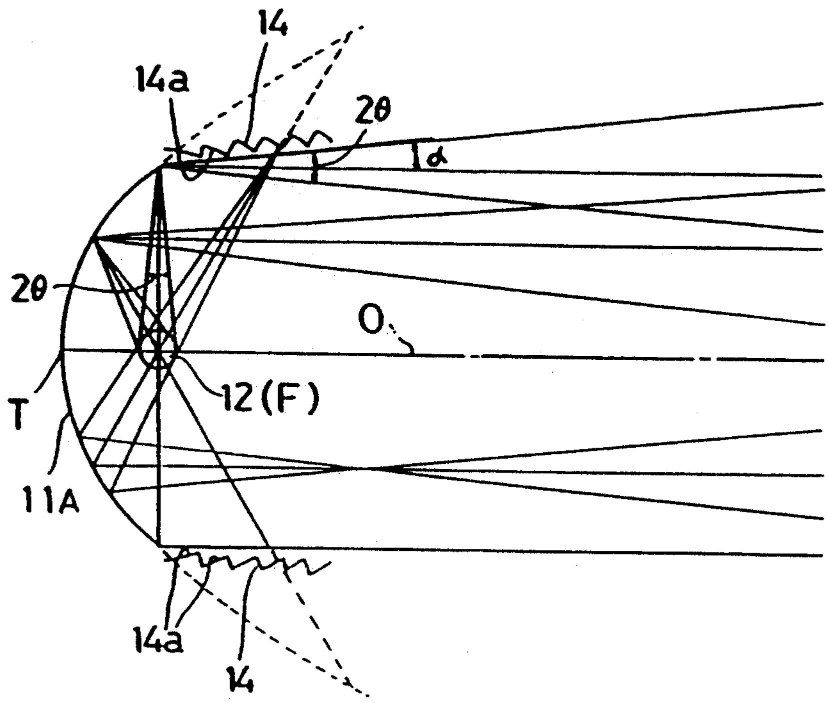
FIG. 9A is a theoretical schematic view of rays of light in which the size of the light source is neglected in an illuminating reflection apparatus according to a fourth embodiment of the present invention.
Figure 9B:
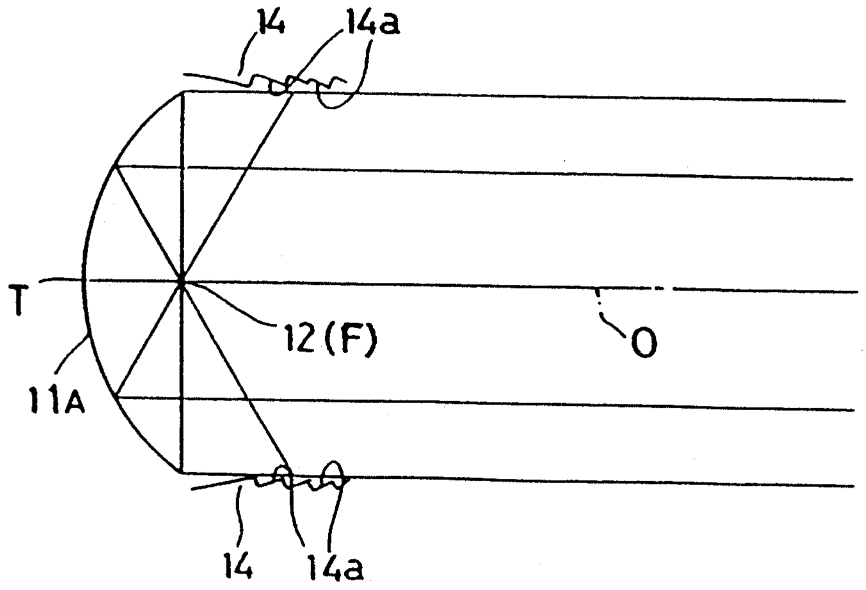
FIG. 9B is a view similar to FIG. 9A, in which the size of the light source is taken into account.

In a modified embodiment illustrated in FIGS. 9A and 9B, the spherical mirror 13A is replaced with a spherical Fresnel mirror 14 which is similar to that of the first embodiment illustrated in FIGS. 1A and 1B. FIGS. 9A and 9B correspond to FIGS. 8A and 8B. In FIGS. 9A and 9B, the elements corresponding to those of FIGS. 8A and 8B are designated with the same reference numerals.

Figure 10A:
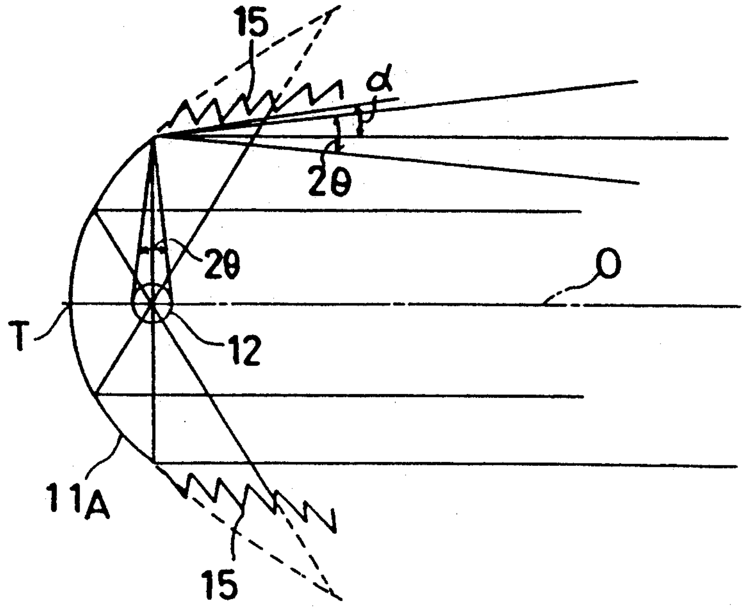
FIG. 10A is a theoretical schematic view of rays of light in which the size of light source is neglected in an illuminating reflection apparatus according to a fifth embodiment of the present invention.
Figure 10B:
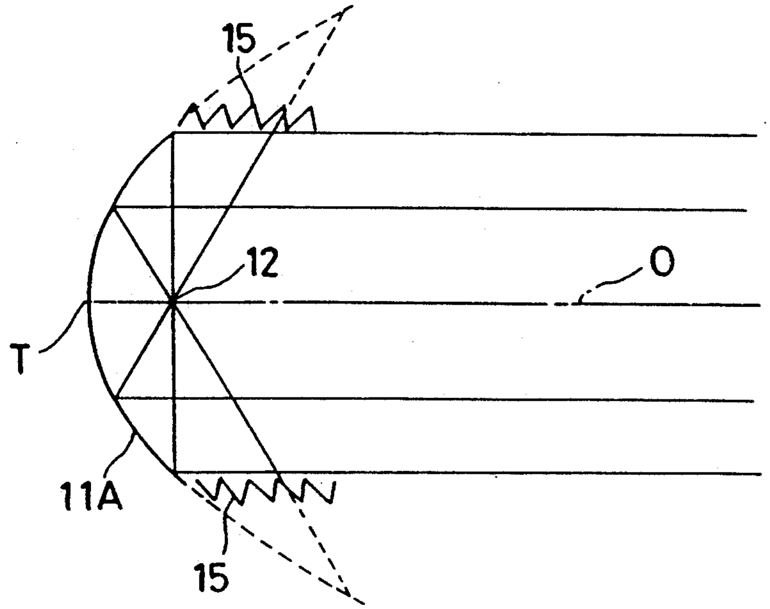
FIG. 10B is a view similar to FIG. 10A, in which the size of the light source is taken into account.

In an embodiment illustrated in FIGS. 10A and 10B, the spherical mirror 13A is replaced with a micro roof mirror 15 which is similar to that of FIGS. 2A, 2B, 3A and 3B.

The technical effect of the present invention will be explained below with reference to FIG. 11.

Figure 11:
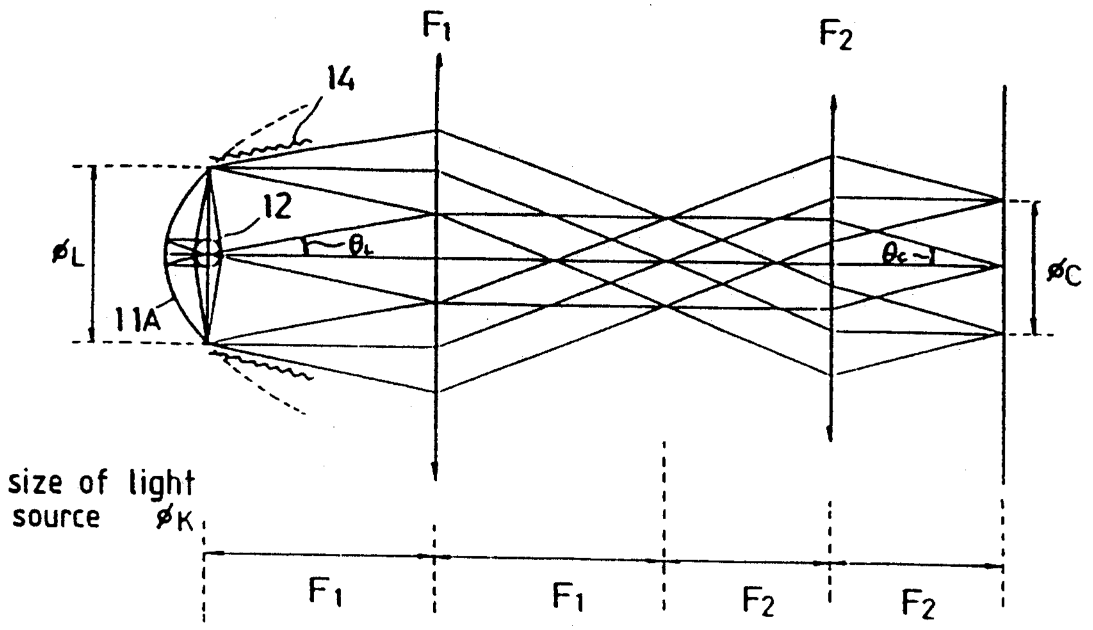
FIGS. 11 and 12 are schematic views of rays of light, showing a technical effect of the present invention, in comparison with the prior art.

In FIG. 11, "$\phi_L$" designates the light flux diameter at the open end of the illuminating reflection apparatus of the present invention in which the spherical Fresnel mirror 14 is used, and "$\phi_c$" designates the effective diameter of an object (chart). To project the light flux diameter "$\phi_L$" as a reduced chart of the effective diameter "$\phi_c$", two lens systems $F_1$ and $F_2$ are used.

There is a following relationship between these parameters;

$$\phi_c/\phi_L = F_2/F_1 \qquad ①$$

Taking the diameter $\phi_K$ of the light source into consideration, the largest spread angle $\theta_L$ (on one side) of rays of light emitted from the illuminating reflection apparatus, according to the present invention, at the open end of the mirror 11 with respect to the optical axis O, is given by the following formula;

$$\phi_K/2 = f\cdot\sin\theta_L \qquad ②'$$

If the Abbe's sine condition is satisfied, the convergence angle $\theta_c$ (on one side) of rays of light onto the chart satisfies the following equation;

$$\begin{aligned} F_1\sin\theta_L &= F_2\sin\theta_c \\ \therefore \sin\theta_c &= F_1/F_2\cdot\sin\theta_L \\ &= F_1/F_2\cdot\phi_K/2f\,(\because ②') \\ &= \phi_L/\phi_c\cdot\phi_K/2f\,(\because ①') \ldots ③' \end{aligned}$$

On the assumption that the F-number of the projection lens (not shown) provided behind the chart, necessary to receive all the rays of light transmitted through the chart is defined by the following formula;

$$F_{NO} = \tfrac{1}{2}\sin\theta_c$$

we have the following equation ④' from formula ③';

$$F_{NO} = \phi_c/\phi_L\cdot f/\phi_K \qquad ④'$$

Figure 12:
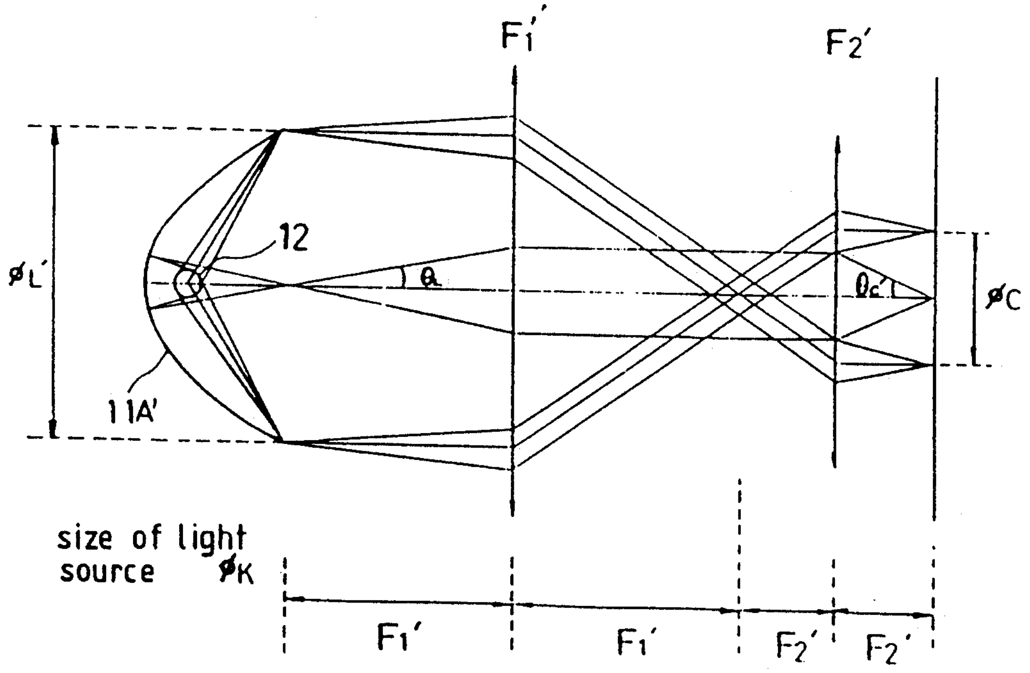

In FIG. 12 which shows an arrangement similar to FIG. 11, a conventional elliptical mirror 11A' is used for comparison. In FIG. 12, "$\phi_c$" designates the effective diameter of the chart, "$\phi_K$" the diameter of the light source, and "$\phi_L'(>\phi_L)$" the diameter of the light flux at the open end of the elliptical mirror 11'. In this state, $$\phi_c/\phi_L' = F_2'/F_1' \qquad ⑤'$$

The maximum convergence angle $\theta_c'$ (on one side) of rays of light onto the chart is given by;

$$\begin{aligned} F_1'\sin\theta_L &= F_2'\sin\theta_c' \\ \therefore \sin\theta_c' &= F_1'/F_2'\cdot\sin\theta_L \\ &= F_1'/F_2'\cdot\phi_K/2f\,(\because ②') \\ &= \phi_L'/\phi_c\cdot\phi_K/2f\,(\because ⑤') \ldots ⑥' \end{aligned}$$

The F-number $F_{NO}'$ of the projection lens (not provided behind the chart, necessary to receive all the rays of light transmitted through the chart is given by the following formula;

$$F_{NO}' = \phi_c/\phi_L'\cdot f/\phi_K \qquad ⑦'$$

The relationships between the illuminating reflection apparatuses and the prior art, according to the present invention, are as follows;

$$\phi_L' > \phi_L$$

From ④' and ⑦', $$F_{NO} > F_{NO}'$$

This means that the F-number of the projection lens provided behind the chart, necessary for receiving all the rays of light transmitted through the chart, in the present invention is larger than that of the parabolic mirror 11A' in the prior art. Generally speaking, lens design becomes easier and less expensive as the F-number thereof becomes larger.

When the F-number of the projection lens is $F_{NO}''(>F_{NO}>F_{NO}')$, only a part of the rays of light transmitted through the chart can be received by the projection lens. The efficiencies K and K' of the utilization of light (light acceptance efficiencies) in the present invention and the prior art are given by;

$$K = (F_{NO}/F_{NO}'')^2$$

$$K' = (F_{NO}'/F_{NO}'')^2$$

Namely, $K > K'$

This proves that a higher light utilization efficiency can be achieved by the present invention.

In an example, when $\phi_L'=70$ mm, $\phi_c=30$ mm, $F_1=F_1'=50$ mm, $f=10$ mm, $\phi_K=4$ mm, and $\phi_L=40$ mm (90° from the optical axis$=4f$);

$$F_2 = 37.5 \text{ mm},\ F_2' = 21.429 \text{ mm}$$

($\theta_L=11.537°$, $\theta_c'=27.818°$, $\theta_c=15.466°$)

and, $F_{NO}=1.875$, $F_{NO}'=1.071$

It can be understood that according to the present invention, a projection lens having a larger F-number can be used.

If $F_{NO}''=4$, $K=0.220$, $K'=0.072$

This means that the light utilization efficiency in resent invention is about three times that of the prior art.

Figure 15:
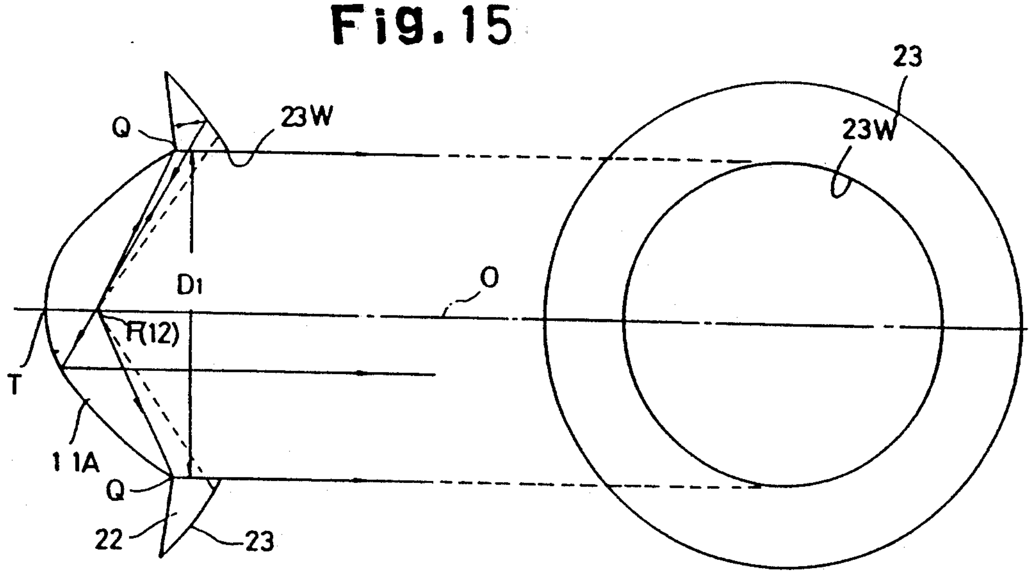
FIGS. 13, 14 and 15 are schematic views of rays of light according to different embodiments of the present invention.
Figure 13:
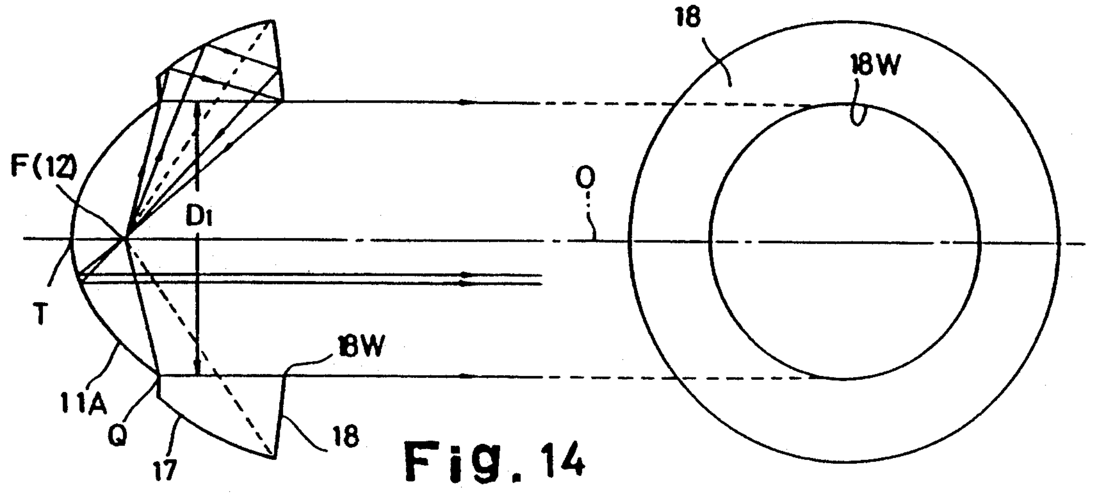
Figure 14:
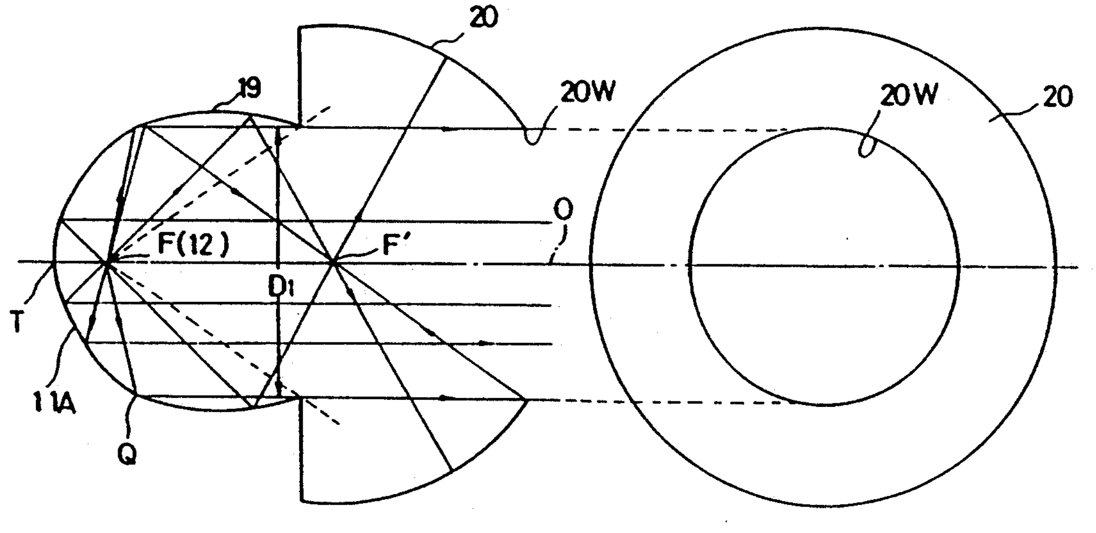
Figure 16:
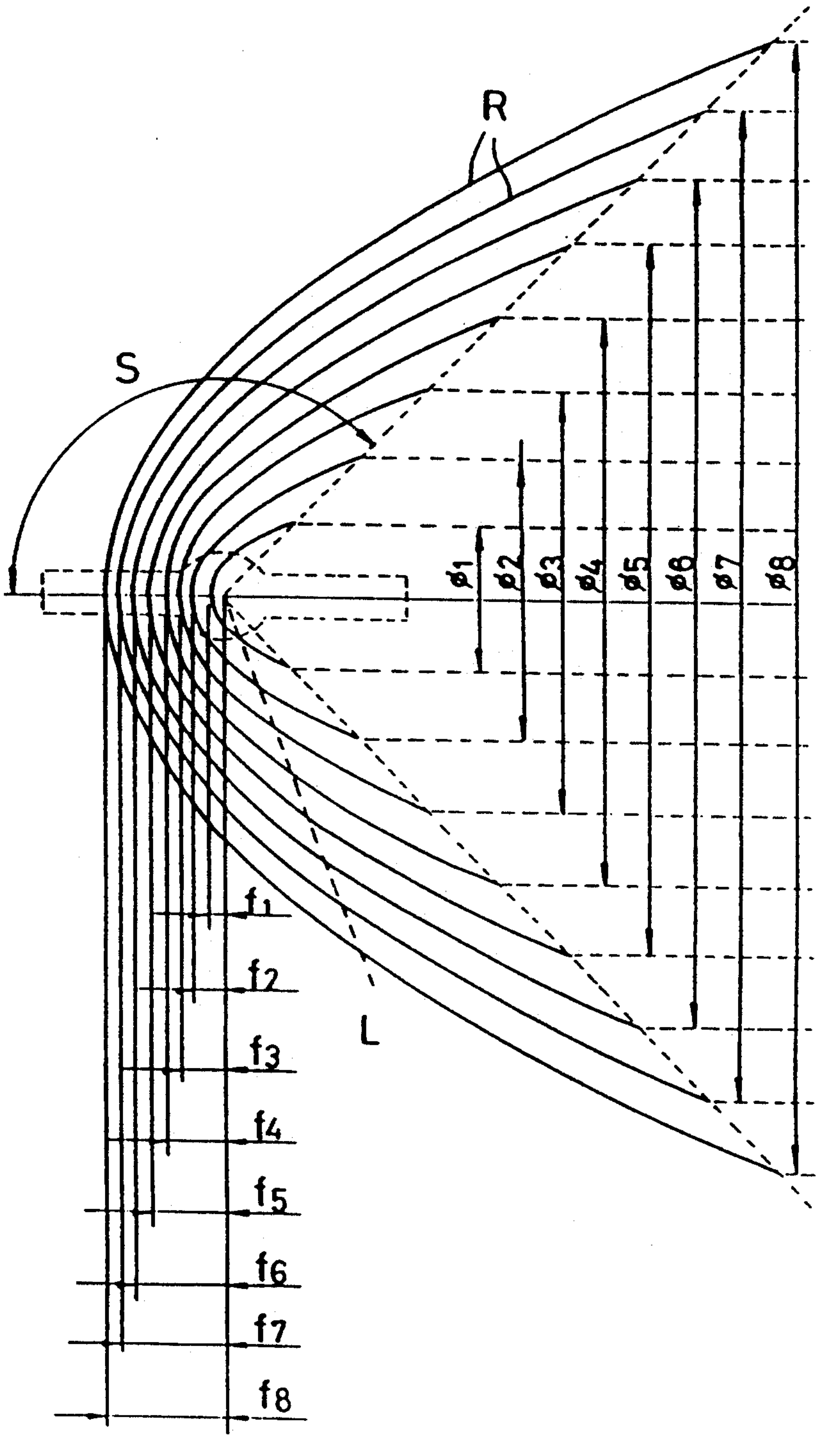
FIG. 16 is a diagram showing the relationship between a focal length and an emission light flux diameter in a parabolic mirror when an acceptance angle is constant.

The following discussion will be directed to different embodiments illustrated in FIGS. 13 through 15.

In FIG. 13, a combination of an elliptical mirror 17 and a hyperbolic mirror 18, having an illuminating circular opening 18W$_1$ is used as an auxiliary reflecting means. The diameter of the illuminating opening 18W is substantially identical to the diameter $D_1$ of the open end of the parabolic mirror 11A. One of the focal points of the elliptical mirror 17 is common to the focal point F of the parabolic mirror 11A, so that the direct rays of light from the light source 12 are reflected toward the other focal point thereof. The hyperbolic mirror 18 has two focal points coincidental with the focal points of the elliptical mirror 17, so that the rays of light reflected by the elliptical mirror 17 toward the other focal point are reflected toward the light source 12. Consequently, the same operation and technical effect as those of the previous embodiments are also obtained in the embodiment illustrated in FIG. 13.

In FIG. 14, the auxiliary reflecting means is constituted by the combination of an elliptical mirror 19 and a spherical mirror 20. One of the focal points of the elliptical mirror 19 is common to the focal point F of the parabolic mirror 11A. The other focal point F' of the elliptical mirror 19 coincides with the center of the spherical mirror 20 which has an illuminating opening 20W. The diameter of the illuminating opening 20W and the minimum diameter of the elliptical mirror 19 are substantially identical to the diameter $D_1$ of the open end of the parabolic mirror 11A. In this embodiment, the rays of light, emitted from the light source F(12) and reflected by the elliptical mirror 19 toward the other focal point F' of the elliptical mirror 19, are reflected by the spherical mirror 20 and are then returned along the same optical path. Consequently, the same operation and technical effect as those of the previous embodiments are also achieved in the embodiment shown in FIG. 14.

In FIG. 15, the auxiliary reflecting means is constituted by the combination of spherical mirror 22 and an elliptical mirror 23 which has an illuminating opening 23W at the center thereof. The diameter of the illuminating opening 23W is substantially identical to the diameter $D_1$ of the open end of the parabolic mirror 11A. One of the focal points of the elliptical mirror 23 is common to the focal point F of the parabolic mirror 11A. The center of the spherical mirror 22 is identical to the other focal point of the elliptical mirror 23. In this embodiment, the rays of light that are emitted from the light source 12 and that reach the elliptical mirror 23 are reflected thereby toward the other focal point of the elliptical mirror 23. The spherical mirror 22 returns the reflected light incident thereon. Consequently, the same operation and technical effect, as those of the previous embodiments, are also achieved in the embodiment shown in FIG. 15.

In the above mentioned embodiments, the light source 12 is located at the focal point of the main mirror 11 or 11A. The inventors of the present invention have found that if the light emitting portion is offset from the focal point of the main mirror at a predetermined deviation, a better distribution of illuminance and a higher light utilization efficiency could be obtained. To this end, FIGS. 17 through 23 are directed to different embodiments in which the light source is not coincidental with the focal point of the main mirror.

Figure 17:
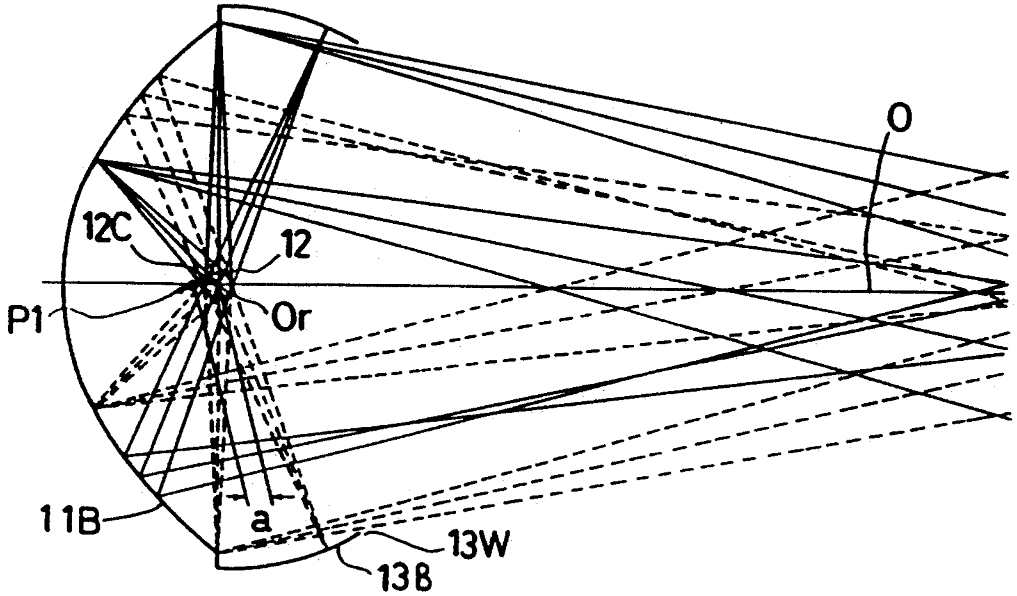
FIG. 17 is a schematic view of rays of light in an illuminating reflection apparatus according to another embodiment of the present invention.
Figure 18:
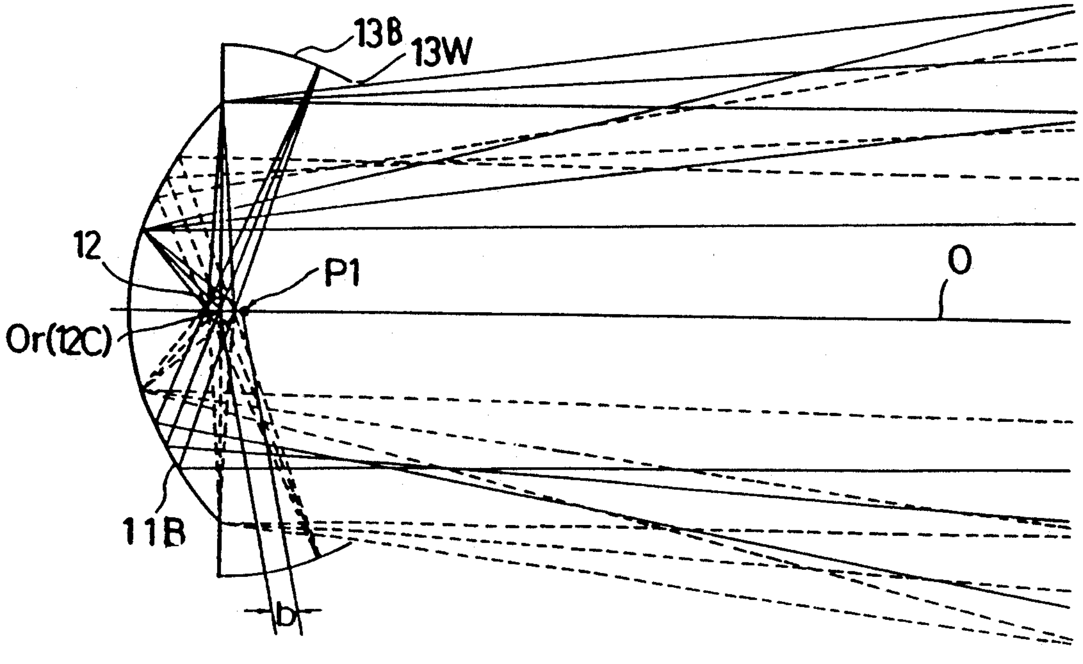
FIG. 18 is a schematic view of rays of light in an illuminating reflection apparatus according to still another embodiment of the present invention.

In FIGS. 17 and 18, the main mirror 11B and the auxiliary mirror 13B are constituted by an elliptical mirror and an annular spherical mirror, respectively. The auxiliary mirror 13B has an illuminating opening 13W coaxial to the optical axis O at the center thereof. The auxiliary mirror 13B is located at the open end of the main mirror 11B. The central light emitting portion 12C of the light source 12 is located at the sphere center Or of the auxiliary mirror (spherical mirror) 13B.

As is well known, the main mirror 11B has first and second focal points P1 and P2. In the illustrated embodiment, the first focal point P1 of the main mirror 11B is offset from the sphere center (i.e., the central light emitting portion of the light source 12) Or of the auxiliary mirror 13B in the direction of the optical axis O. In FIGS. 17 and 18, the main mirror 11B is rearwardly and forwardly offset, respectively, from the central light emitting portion 12C of the light source 12 by deviations "a" and "b", respectively. Note that the deviations "a" and "b" are exaggerated in the drawings.

The direction and amount of the deviation "a" or "b" is determined in accordance with the shape of the main mirror 11B and the size of the light source 12, etc. by computer simulation. The proper deviation ensures an improved distribution of illuminance and an enhanced utilization efficiency of light, in comparison with the previous embodiments in which there is no offset (i.e., the first focal point P1 of the main mirror 11B coincides with the sphere center or of the auxiliary mirror 13B).

On the other hand, it should be noted that the sphere center Or of the auxiliary mirror 11B is made precisely coincident with the central light emitting portion 12C of the light source 12. The reasons thereof are as follows (particularly see FIGS. 19A through 19C).

Figure 19A:
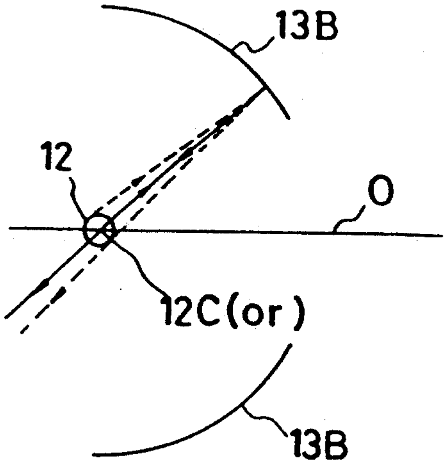
FIGS. 19A, 19B and 19C are explanatory views showing a relationship between a lamp (light source) and an auxiliary mirror in an illuminating reflection apparatus according to the present invention.

In FIG. 19A in which the central light emitting portion 12C of the light source 12 is made coincidental with the sphere center Or of the auxiliary mirror 13B, the rays of light, emitted from the light source 12 toward the auxiliary mirror 13B, are reflected by the auxiliary mirror 13B to be returned to the light source 12. Namely, an image of the light source 12 by the auxiliary mirror 13B is formed at the light source 12 without aberration.

Figure 19B:
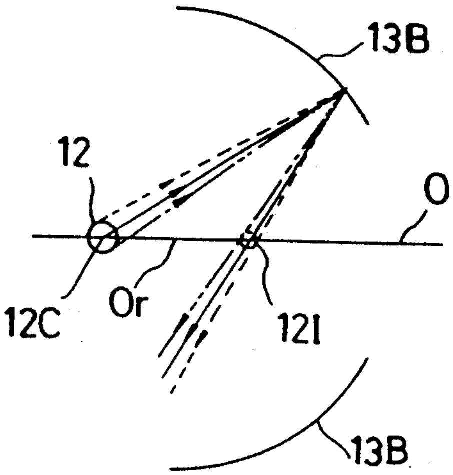
Figure 19C:
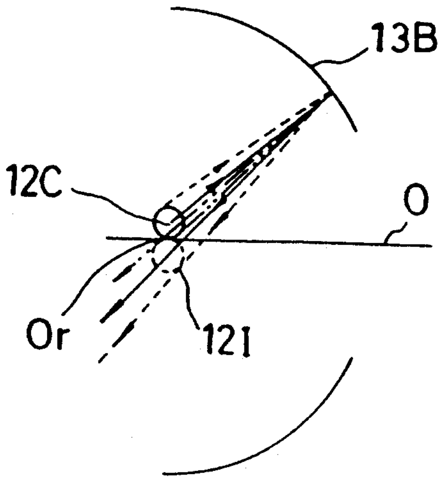

On the other hand, if the central light emitting portion 12C of the light source 12 is deviated from the sphere center Or of the auxiliary mirror 13B, as shown in FIGS. 19B and 19C, a magnified image 12I, of the light source 12 by the auxiliary mirror 13B, is formed at a position symmetrical to the light source 12 with respect to the sphere center Or. For the main mirror 11B, this is substantially equivalent to an enlargement of the light emitting portion, since the light source 12 and the image 12I thereof are positioned at various locations. It is apparent that an enlarged light emitting portion would reduce the convergent efficiency of light onto an illumination area of an object.

Figure 20:
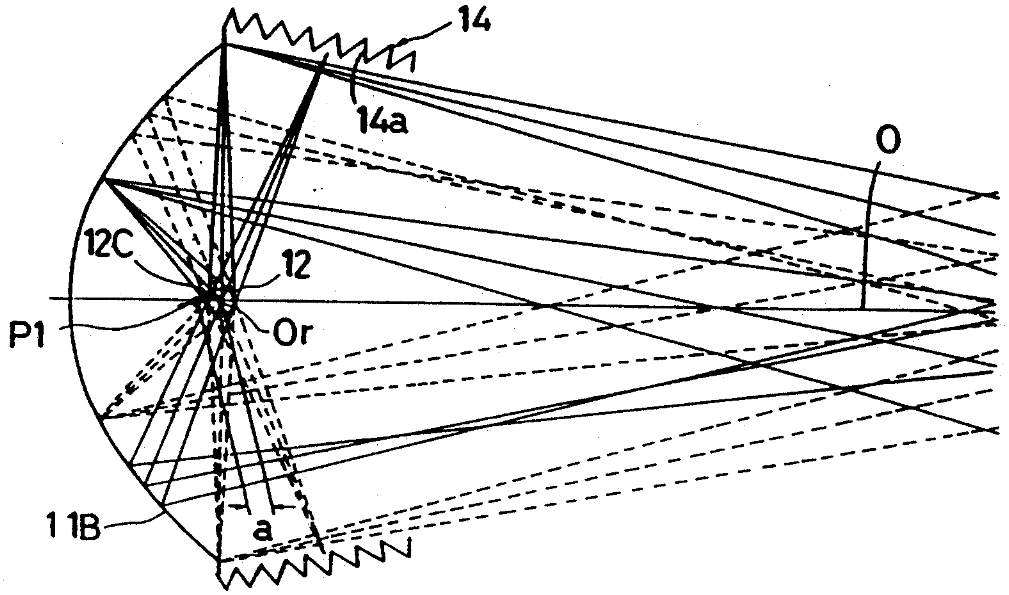
FIG. 20 is a schematic view of rays of light according to a modified embodiment of the present invention.
Figure 21:
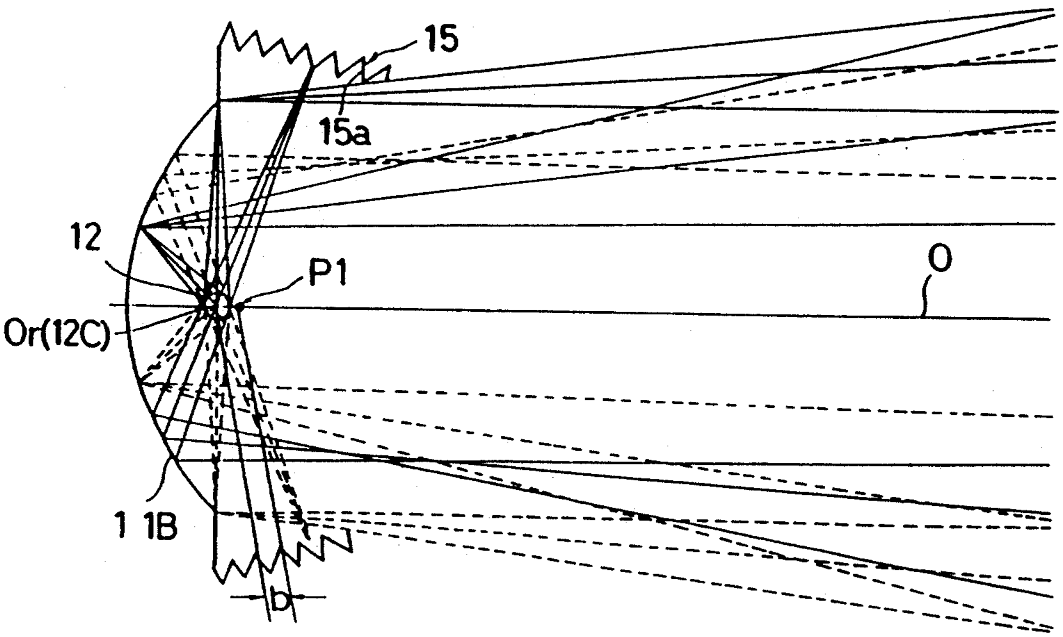
FIG. 21 is a schematic view of rays of light according to a different embodiment of the present invention.

FIGS. 20 and 21 show different embodiments in which the auxiliary mirror 13B, shown in FIG. 17, is replaced with a spherical Fresnel mirror 14 and a micro roof mirror 15, respectively. The spherical Fresnel mirror 14 is identical to that shown in FIGS. 1A and 1B, and the micro roof mirror 15 is identical to that shown in FIGS. 2A, 2B, 3A and 3B, respectively.

Figure 22A:
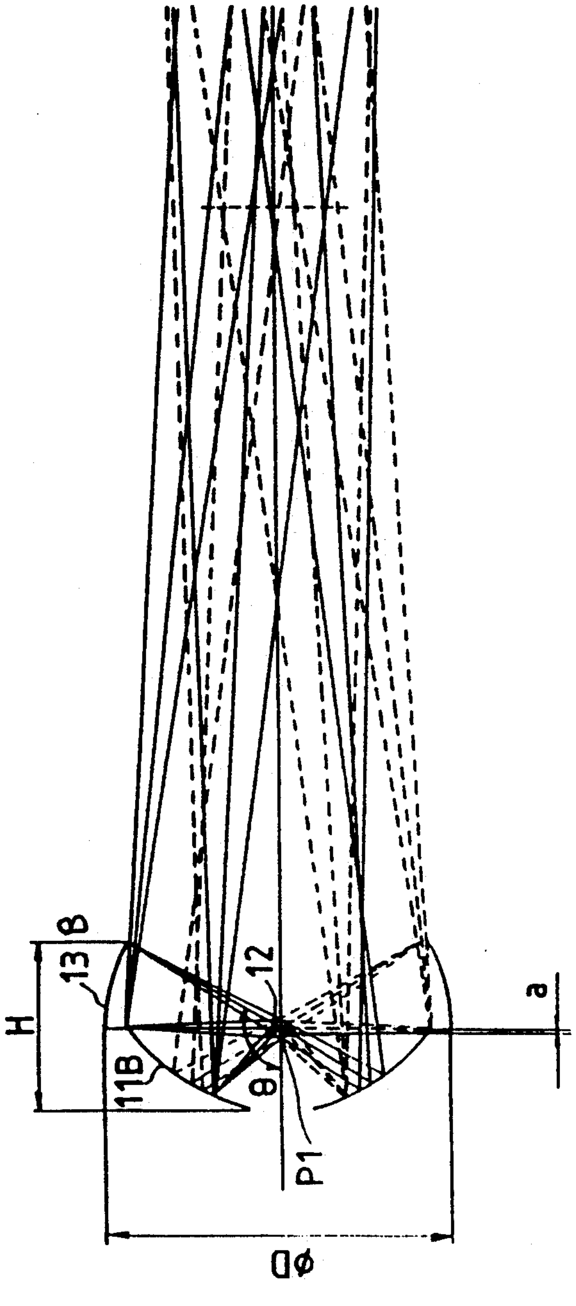
FIGS. 22A, 22B and 22C are schematic views of rays of light of an illuminating reflection apparatus according to the present invention, a first comparison example and a second comparison example, respectively; and, FIGS. 23A, 23B and 23C are diagrams of an illuminance distribution and illuminance ratio in an illuminating reflection apparatus according to the present invention.
Figure 22B:
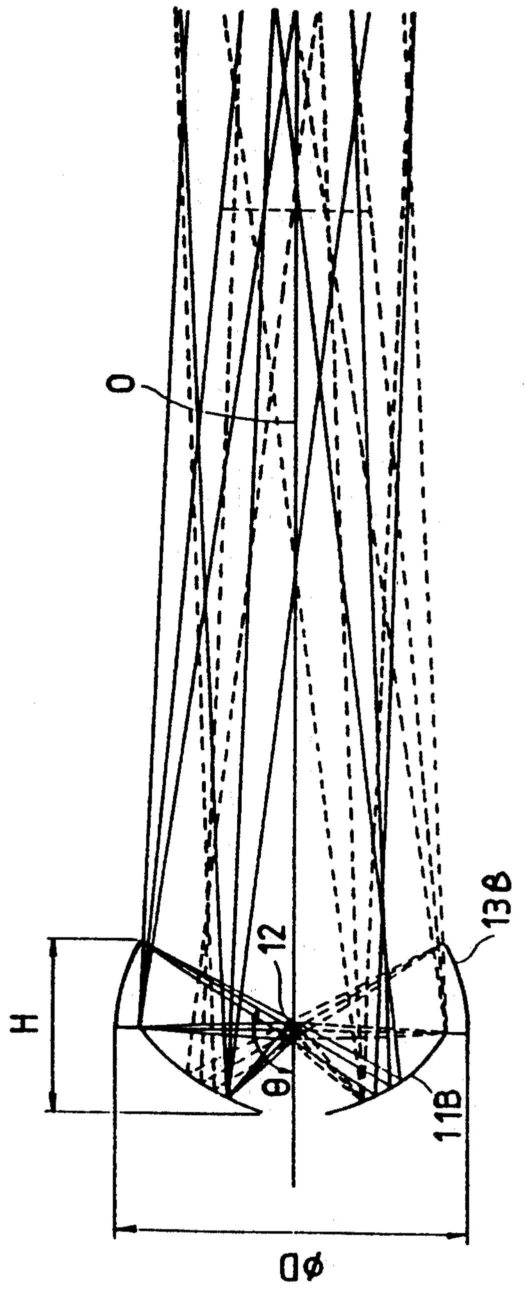
Figure 22C:
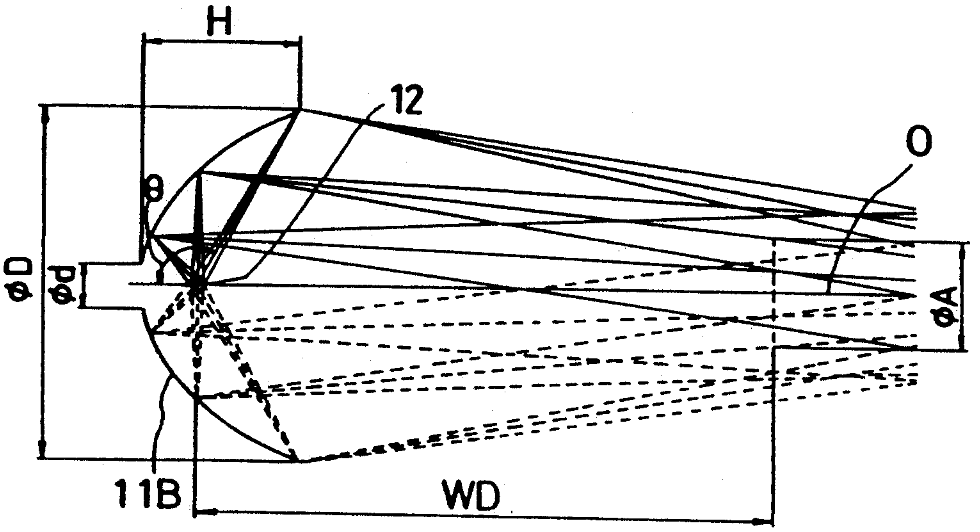
Figure 23A:
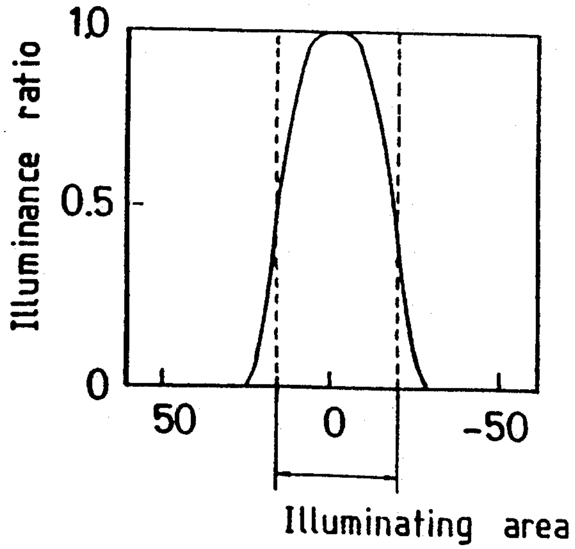
Figure 23B:
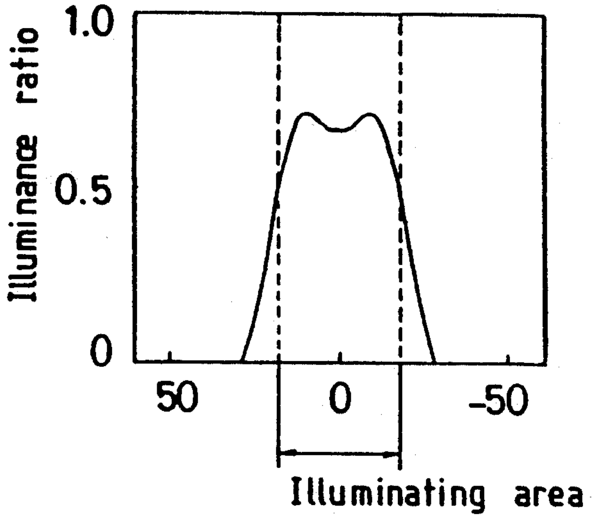
Figure 23C:
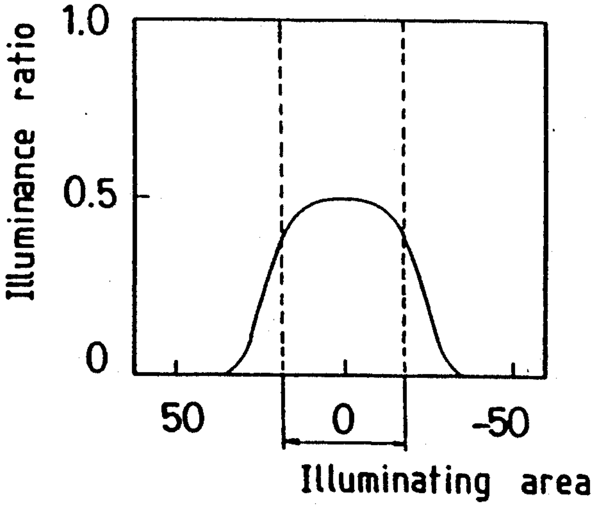

FIGS. 22A, 22B and 22C show the present invention, a first comparison example, in which the first focal point P1 of the main mirror 11B coincides with the sphere center Or of the auxiliary mirror 13B, and a second comparison example in which the reflection mirror is constituted only by the main mirror 11B, respectively.

In these illuminating reflection apparatuses;

the light source 12: sphere of $\phi 4$ mm;

the main mirror 11B: elliptical mirror of $P1=20$ mm, $P2=400$ mm, conical coefficient $K=-0.819$, and a diameter of $\phi d$ of a hole through which the light source passes on the optical axis $O=16$ mm;

the auxiliary mirror 13B: spherical mirror of radius $R=44$ mm;

illuminating area: $\phi A=\phi 36$ mm;

distance between the light source 12 and the illuminating area: $WD=200$ mm;

acceptance angle of light from the light source 12 by the reflection mirror: $\theta=120°$;

deviation of the auxiliary mirror 13B: $a=0.4$ mm

The experimental results of the illuminance distribution and the illuminance ratio (the illuminance in the illuminating reflection apparatus of the present invention is assumed to be 1) in the illuminating area are shown in FIGS. 22A, 22B and 22C. As can be seen from FIGS. 22A, 22B and 22C, in an improved illuminance distribution obtained by the present invention, there is a maximum quantity of light particularly at the center portion, and this quantity of light gradually decreases toward the circumferential portion, in comparison with the first and second comparison examples.

The Table below shows experimental results of the convergent efficiency (the total of the light flux within the illuminating area and the light flux emitted from the light source 12), the size ($\phi D$ mm $\times$ H mm) of the reflection mirror of the whole optical system (including the main mirror 11B and the auxiliary mirror 13B), and the F-number of the projection lens for receiving the light flux within the illuminating area.

As can be seen from the Table, according to the present invention, an increased convergent efficiency can be obtained and the reflection mirror can be wholly made small, particularly in comparison with Example 2 (the second comparison example).

TABLE

| | Present Invention | Example 1 | Example 2 |
|---|---|---|---|
| convergent efficiency | 64.6% | 55.7% | 40.2% |
| Size of Reflection Mirror | $\phi 88.0 \times 41.6$ | $\phi 88.0 \times 41.2$ | $\phi 120.5 \times 53.9$ |
| Projection lens $F_{NO}$ | 3.08 | 3.29 | 2.88 |

We claim:

1. An illuminating reflection apparatus comprising:
a light source having a light emitting portion,
a main mirror for reflecting light emitted from said light source toward an illumination area, said main mirror comprising an elliptical mirror, and
an auxiliary mirror for reflecting light emitted from said light source toward said main mirror,
said light source and said auxiliary mirror being correlated so that light emitted from said light emitting portion and reflected by said light auxiliary mirror is returned to said light emitting portion, wherein said auxiliary mirror comprises a spherical Fresnel mirror.

2. An illuminating reflection apparatus according to claim 1, wherein said auxiliary mirror has a focal point coincident with said light emitting portion of said light source.

3. An illuminating reflection apparatus comprising:
a light source having a light emitting portion,
a main mirror for reflecting light emitted from said light source toward an illumination area, said main mirror comprising an elliptical mirror, and
an auxiliary mirror for reflecting light emitted from said light source toward said main mirror,
said light source and said auxiliary mirror being correlated so that light emitted from said light emitting portion and reflected by said auxiliary mirror is returned to said light emitting portion, wherein said auxiliary mirror comprises a micro roof mirror.

4. An illuminating reflection apparatus comprising:
a light source having a light emitting portion,
a main mirror for reflecting light emitted from said light source toward an illumination area, said main mirror comprising an elliptical mirror, and
an auxiliary mirror for reflecting light emitted from said light source toward said main mirror,
said light source and said auxiliary mirror being correlated so that light emitted from said light emitting portion and reflected by said auxiliary mirror is returned to said light emitting portion, wherein said main mirror has a focal point offset from said light emitting portion of said light source.

5. An illuminating reflection apparatus according to claim 4, wherein said focal point of said main mirror is offset from said light emitting portion in an optical axis direction of the illuminating light.

6. An illuminating reflection apparatus comprising:
a light source,
an elliptical mirror for reflecting light emitted from said light source toward an illuminating area, and
an auxiliary mirror provided at the open end of said elliptical mirror to reflect light emitted from said light source toward said light source, wherein said auxiliary mirror comprises a spherical Fresnel mirror.

7. An illuminating reflection apparatus according to claim 6, wherein said spherical Fresnel mirror is provided so as not to intercept the outermost light emitted from said light source and reflected by the open end of said elliptical mirror.

8. An illuminating reflection apparatus according to claim 6, wherein said light source is located on a first focal point of said elliptical mirror.

9. An illuminating reflection apparatus according to claim 6, wherein said elliptical mirror extends to a plane substantially perpendicular to the optical axis and substantially passing a first focal point of said elliptical mirror.

10. An illuminating reflection apparatus comprising:

a light source, a parabolic mirror for reflecting light emitted from said light source toward an illuminating area, and an auxiliary mirror provided at an open end of said parabolic mirror to reflect light emitted from said light source toward said light source, wherein said auxiliary mirror is provided so as not to intercept the outermost light emitted from and reflected by said light source and said parabolic mirror, respectively.

11. An illuminating reflection apparatus according to claim 10, wherein said parabolic mirror extends so that an angle defined by the optical axis and a plane passing an open end of said parabolic mirror and the focal point thereof is more than 90°.

12. An illuminating reflection apparatus according to claim 10, wherein said auxiliary mirror has an illuminating opening at its center portion.

13. An illuminating reflection apparatus according to claim 12, wherein said diameter of the illuminating opening of said auxiliary mirror is substantially identical to the diameter of the open end of said parabolic mirror.

14. An illuminating reflection apparatus according to claim 10, wherein said auxiliary mirror comprises an annular spherical mirror.

15. An illuminating reflection apparatus according to claim 10, wherein said auxiliary mirror comprises a spherical Fresnel mirror.

16. An illuminating reflection apparatus according to claim 10, wherein said auxiliary mirror comprises a micro roof mirror.

17. An illuminating reflection apparatus according to claim 10, wherein said auxiliary mirror comprises an elliptical mirror and a hyperbolic mirror.

18. An illuminating reflection apparatus according to claim 10, wherein said auxiliary mirror comprises an elliptical mirror and a spherical mirror.

19. An illuminating reflection apparatus according to claim 10, wherein said auxiliary mirror comprises at least two spherical mirrors.

20. An illuminating reflection apparatus comprising:

a light source, an elliptical mirror for reflecting light emitted from said light source toward an illuminating area, and an auxiliary mirror provided at the open end of said elliptical mirror to reflect light emitted from said light source toward said light source, wherein said auxiliary mirror comprises a micro roof mirror.

21. An illuminating reflection apparatus according to claim 20, wherein said micro roof mirror is provided so as not to intercept the outermost light emitted from said light source and reflected by the open end of said elliptical mirror.

* * * * *

UNITED STATES PATENT AND TRADEMARK OFFICE

CERTIFICATE OF CORRECTION

PATENT NO. : 5,272,570

DATED : December 21, 1993

INVENTOR(S) : K. YOSHIDA

It is certified that error appears in the above-indentified patent and that said Letters Patent is hereby corrected as shown below:

At column 14, line 2 (claim 1, line 4) of the printed patent, change "illumination" to ---illuminating---.

At column 14, line 8 (claim 1, line 10) of the printed patent, delete "light".

At column 14, line 19 (claim 3, line 4) of the printed patent, change "illumination" to ---illuminating---.

At column 14, line 32 (claim 4, line 4) of the printed patent, change "illumination" to ---illuminating---.

Signed and Sealed this

Twenty-eighth Day of January, 1997

*Attest:*

BRUCE LEHMAN

*Attesting Officer* *Commissioner of Patents and Trademarks*